(12) United States Patent
Naquin

(10) Patent No.: US 10,605,372 B2
(45) Date of Patent: Mar. 31, 2020

(54) METHOD AND APPARATUS FOR DEACTIVATING A HYDRAULIC DEVICE THAT IS LEAKING HYDRAULIC OIL

(71) Applicant: GULFSTREAM SERVICES, INC., Houma, LA (US)

(72) Inventor: Joey Naquin, Houma, LA (US)

(73) Assignee: GULFSTREAM SERVICES, INC., Houma, LA (US)

( * ) Notice: Subject to any disclaimer, the term of this patent is extended or adjusted under 35 U.S.C. 154(b) by 599 days.

(21) Appl. No.: 13/741,074

(22) Filed: Jan. 14, 2013

(65) Prior Publication Data
US 2013/0199619 A1  Aug. 8, 2013

Related U.S. Application Data

(60) Provisional application No. 61/727,324, filed on Nov. 16, 2012, provisional application No. 61/586,530, filed on Jan. 13, 2012.

(51) Int. Cl.
*F16K 17/24* (2006.01)
*G01M 3/26* (2006.01)
(Continued)

(52) U.S. Cl.
CPC ............ *F16K 17/24* (2013.01); *F15B 19/005* (2013.01); *G01M 3/26* (2013.01); *F15B 20/005* (2013.01);
(Continued)

(58) Field of Classification Search
CPC .................. F15B 19/005; F15B 20/005; F15B 2211/632; G01L 19/0672
(Continued)

(56) References Cited

U.S. PATENT DOCUMENTS 3,159,965 A * 12/1964 Woolley et al. ................ 60/431
3,982,591 A * 9/1976 Hamrick ................. E21B 34/16
166/302
(Continued)

FOREIGN PATENT DOCUMENTS

DE    10355250 A1    6/2005
EP     0748437 B1    5/2000
(Continued)

OTHER PUBLICATIONS

International Written Opinion and Search Report for International Application No. PCT/US13/21457.

*Primary Examiner* — Thomas E Lazo
*Assistant Examiner* — Matthew Wiblin
(74) *Attorney, Agent, or Firm* — Garvey, Smith & Nehrbass, Patent Attorneys, L.L.C.; Charles C. Garvery, Jr.; Julie R. Chauvin

(57) ABSTRACT

A method of deactivating an underwater hydraulic device includes providing a hydraulic device operable under water, the device having a hydraulic cylinder with a pushrod and a piston. The device is lowered below a water surface with a hose reel that is located at the water surface area such as on a marine vessel. The hose reel includes first and second hydraulic hoses that connect to the cylinder on opposing sides of the piston. Fluid flow in the first and second hydraulic hoses is continuously monitored. The ratio of the volume of fluid flowing into the cylinder from one side of the piston to the volume of fluid flowing into the cylinder from the other side of the cylinder is continuously calculated with a computer or controller. The hydraulic device is deactivated if the ratio varies from a preset value.

23 Claims, 13 Drawing Sheets

(51) Int. Cl.
 *F15B 19/00* (2006.01)
 *F15B 20/00* (2006.01)
(52) U.S. Cl.
 CPC . *F15B 2211/632* (2013.01); *F15B 2211/8636* (2013.01); *Y10T 137/0379* (2015.04); *Y10T 137/7722* (2015.04)
(58) Field of Classification Search
 USPC .......................................... 60/399, 403, 431
 See application file for complete search history.

(56) References Cited

U.S. PATENT DOCUMENTS

| | | | | |
|---|---|---|---|---|
| 4,185,652 | A | * | 1/1980 | Zintz ................... E21B 33/0355 137/628 |
| 4,471,797 | A | | 9/1984 | Cass et al. |
| 4,725,088 | A | * | 2/1988 | Mank .............................. 294/90 |
| 5,272,646 | A | * | 12/1993 | Farmer .......................... 702/51 |
| 5,748,077 | A | * | 5/1998 | Brandt .......................... 340/450 |
| 5,829,470 | A | * | 11/1998 | Yowell et al. ............. 137/87.06 |
| 6,026,682 | A | * | 2/2000 | McCormick ................... 73/196 |
| 8,020,659 | B2 | * | 9/2011 | Schultz et al. ................ 180/301 |
| 2008/0028619 | A1 | * | 2/2008 | Bubacz ................. B23D 17/06 30/134 |
| 2012/0117959 | A1 | * | 5/2012 | Lewkoski ....................... 60/431 |
| 2012/0215348 | A1 | * | 8/2012 | Skrinde ........................ 700/245 |

FOREIGN PATENT DOCUMENTS

| | | |
|---|---|---|
| SU | 1661483 A1 | 7/1991 |
| SU | 1682648 A1 | 10/1991 |
| WO | WO95/31353 A1 | 11/1995 |

\* cited by examiner

METHOD AND APPARATUS FOR DEACTIVATING A HYDRAULIC DEVICE THAT IS LEAKING HYDRAULIC OIL

CROSS-REFERENCE TO RELATED APPLICATIONS

This is a non provisional patent application of U.S. Provisional Patent Application Ser. No. 61/586,530, filed 13 Jan. 2012, and U.S. Provisional Patent Application Ser. No. 61/727,324, filed 16 Nov. 2012.

Priority of U.S. Provisional Patent Application Ser. No. 61/586,530, filed 13 Jan. 2012, and U.S. Provisional Patent Application Ser. No. 61/727,324, filed 16 Nov. 2012, each of which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved method and apparatus for underwater device leak detection in a hydraulic system or device that includes a hydraulic ram. More particularly, the present invention relates to a method of detecting leaks (e.g. broken or cut hose or leaking seal or fitting) in an underwater hydraulic system that uses an underwater hydraulic cylinder.

2. General Background of the Invention

In the offshore oil and gas industry, there are certain hydraulic devices that are needed in order to complete jobs in an underwater environment. A hydraulic shear is employed to conduct salvage operations. Such a hydraulic shear is lowered to a seabed area, for example several hundred feet (meters) deep. In this offshore environment, leakage of hydraulic oil has a profoundly disastrous effect on the environment.

Therefore, there exists a need for a simple and straightforward yet workable solution to the problem of leakage of hydraulic fluid from devices that are used in a marine environment.

It is not only important that a leak of hydraulic fluid be detected. It is further important that the hydraulic device be immediately disabled so that leakage is limited to a very minimal quantity.

Patents have issued that relate generally to the detection of leakage. One example is the Brandt patent (U.S. Pat. No. 5,748,077). The Brandt patent (U.S. Pat. No. 5,748,077) shuts down the hydraulic system if the leak is detected and notifies individuals in the area that a leak has occurred. The leak detection system has sensors for measuring hydraulic system parameters and a computer for detecting abnormalities in the system based on values returned by the sensors. Sensors used include an rpm pickup, a pressure transducer, a flow meter and a hydraulic fluid level and temperature switch. Outputs of the sensors are analyzed by the computer to determine if the hydraulic system has a leak. If a leak is detected, the computer sends response signals to a device for engaging or disengaging the prime mover from the hydraulic pump and to another device for actuating a valve to stop hydraulic fluid flow from the reservoir. The computer may also send indicator signals to a display console for activating a warning light, a buzzer or a display.

The Cass patent (U.S. Pat. No. 4,471,797) provides a hydraulic circuit breaker reset device. The system includes a pump, reservoir and an actuator system. The hydraulic circuit breaker is arranged to compare fluid flow to and from the actuator system and to shut off this flow in the event the flow to the actuator system is greater than the flow returning from the actuator system by more than a predetermined differential, thereby indicating a leakage condition. A hydraulic circuit breaker reset device is hydraulically connected to the actuator system and to the circuit breaker. When the circuit breaker is in a shut off condition, the reset device continuously pressure tests the actuator system. If the pressure in the actuator system increases to indicate the absence of fluid leakage, the reset device responds to the pressure increase in the actuator system to provide a reset signal to the circuit breaker. After the circuit breaker is reset to its normal operating position, a timing piston returns the reset device to its normal operating condition.

BRIEF SUMMARY OF THE INVENTION

The present invention provides a method and apparatus for detecting a leak in a severed or broken hydraulic hose (or from a leaking seal or leaking fitting) in an underwater marine application. The system employs a hydraulic power unit that can be shut off if a breach or leak is detected. An indicator such as a red light can be activated to show an operator that the leak has occurred and that it has been curtailed.

The apparatus of the present invention provides a portable system that can be easily interfaced with a control hose reel of a hydraulic power unit.

The hydraulic leak detection system of the present invention is important for protection of equipment and for protection of the environment. Leakage of hydraulic fluid in a marine environment is a serious and potentially very costly problem.

The method and apparatus of the present invention measures both pressure and return flow rates. These parameters are then transmitted to a computer that can determine if there is an inconsistent flow ratio. If so, a signal is sent to a suitable switch such as a solenoid that discontinues power to a prime mover such as an engine.

The method and apparatus of the present invention can provide a selector switch that can have multiple, preset parameters as settings. The selector switch can be used to reset depending upon a particular piece of equipment that is being used. A number of settings such as eight settings can be reset or kept as default settings.

The method and apparatus of the present invention give the operator an ability to set exactly how sensitive the system must be in order to react to fluid loss. The system can be programmed to shut off the prime mover or other active part of the hydraulic power unit depending upon how much fluid has to be lost before shut down occurs.

The present invention is an improvement over other leak detection systems such as velocity checks or fuses which cannot be trusted. Additionally, fuses can only be tested if they are destroyed. Thus, a fuse may or may not work.

Another prior art system involves the use of tank level alarms. With large hydraulic cylinders that can hold 15 to 20 gallons (57 to 76 liters) of fluid, a huge amount of fluid must be lost before a level can be reached that can be detected.

Some systems employ a measurement of pump rpm and return flow. Such a parameter as pump rpm cannot be used reliably because some pumps are pressure compensated pumps. A pressure compensating pump varies in efficiency and would result in a high loss of fluid due to a need to set all parameters very high in order to account for fluid bypass within the pump that cannot be accounted for nor noticed without a flow meter on the pressure side.

The present invention thus provides a simple, straightforward, yet effective method and apparatus for quickly halting leakage from a hydraulic system where leakage has occurred in a hose, seal, fitting or other component of such system.

In one embodiment is provided a method and apparatus for leak detection having a microprocessor operably connected to a plurality of flow meters which flow meters are connected to input and output lines connected to one or more hydraulically powered systems.

In one embodiment the method and apparatus can receive flow rate signals from the plurality of flow meters; use the received signals in comparing against predefined values to determine if a leaking exception condition has occurred in one or more of the connected hydraulically powered systems.

In one embodiment the method and apparatus senses and detects the presence of abnormalities in fluid flow to and from one or more of the connected hydraulically powered systems. These abnormalities, when detected, indicate a possible leak has occurred in a particular hydraulic system. Once a leak is identified, the method and apparatus can shut down one or more of the hydraulic systems, overall hydraulic power to the method and apparatus such as the hydraulic pump and/or its prime mover, and/or issue a warning signal.

In one embodiment the method and apparatus can shut down and/or stop hydraulic fluid flow in the method and apparatus by shutting off the hydraulic pump and/or its prime mover. In another embodiment hydraulic fluid flow to one or more of the connected hydraulic systems can be stopped by closing a valve from the hydraulic pump.

In one embodiment, in response to an identified leaking event, the method and apparatus can shut down the hydraulic pump and/or its prime mover, and/or close a valve in the inlet line to the pump and/or stop fluid flow from leaving a hydraulic reservoir.

In one embodiment, if a leaking event is identified, the method and apparatus can send signals for shutting down the particular hydraulic system for which such leaking event was identified, and furthermore issue a warning indicating that a leak has occurred.

In one embodiment, the method and apparatus can be user programmed to enter one or more predefined quantities and one or more predefined time periods in determining a leaking exception and/or a leaking event. In one embodiment the method and apparatus can be user programmed regarding predefined quantities and/or predefined ranges which are to be considered as leaking exceptions.

Leaking conditions monitored in one embodiment can include predetermined combinations of flow ratios between the plurality of flow meters. In one embodiment, one or more predefined quantities and one or more predefined time periods can be compared to real time measurements from the plurality of flow meters. If the values measured from the flow meters exceed a predefined quantity (e.g., predefined flow ratios between the plurality of flow meters) for at least a predefined time period, the method and apparatus can shut down the hydraulic system and issue a warning signal.

In one embodiment the method and apparatus can be user programmed allowing a user to specify the predefined quantity or quantities regarding measurements made by the plurality of flow meters which are considered to be leaking exceptions, along with programming the predefined quantity or quantities of time for which the flow meter measurements must exceed the predefined quantity before being considered a confirmed leaking event.

In one embodiment the method and apparatus can be user programmed regarding the frequency of sampling for which the method and apparatus accepts signals from the plurality of flow meters.

In one embodiment the method and apparatus can intermittently sample the plurality of flow meters, and obtain measured flow meter parameters and then compare such measured parameters against predefined parameters to determine if a leaking condition has occurred.

In one embodiment the method and apparatus can be user programmed regarding predefined time periods for which leaking exceptions are to exist before the method and apparatus identifies a leaking event as occurring and takes remedial action.

In one embodiment the method and apparatus can be user programmed regarding a predefined start up period before the method and apparatus reviews signals from the plurality of flow meters.

In one embodiment, the method and apparatus can monitor the plurality of flow meters only after certain pre-monitoring conditions are satisfied such as expiration of a predefined initial start up period. However, once the required pre-monitoring conditions are satisfied, the method and apparatus can begin checking the plurality of flow meters, obtaining measured parameters, and comparing these against set-up values to determine if a leak has occurred. In various embodiments the checking can be intermittently. In various embodiments the checking can be substantially continuously.

In one embodiment, the system works by monitoring and comparing flow from two flow meters as a ratio. The system has the ability to have volumes put in manually for this comparison. By linking a computer, controller, or laptop to the system and using a service tool to change and add data, the system responds to sensitivity and other variations such as time delay, percentage of leak allowance, and rod and bore size for ratio or motor which is one to one ratio.

In one embodiment the system can employ a "learn" button which is more user friendly. With this function, the user can set this system up without a laptop or service tool. The user simply turns on the system in bypass mode operates the unit when the user has the unit flowing at normal operation. He or she simply switches to the first position on the selector switch and presses the learn button for 5 seconds and the system automatically reads the ratio and stores that data as its setting.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
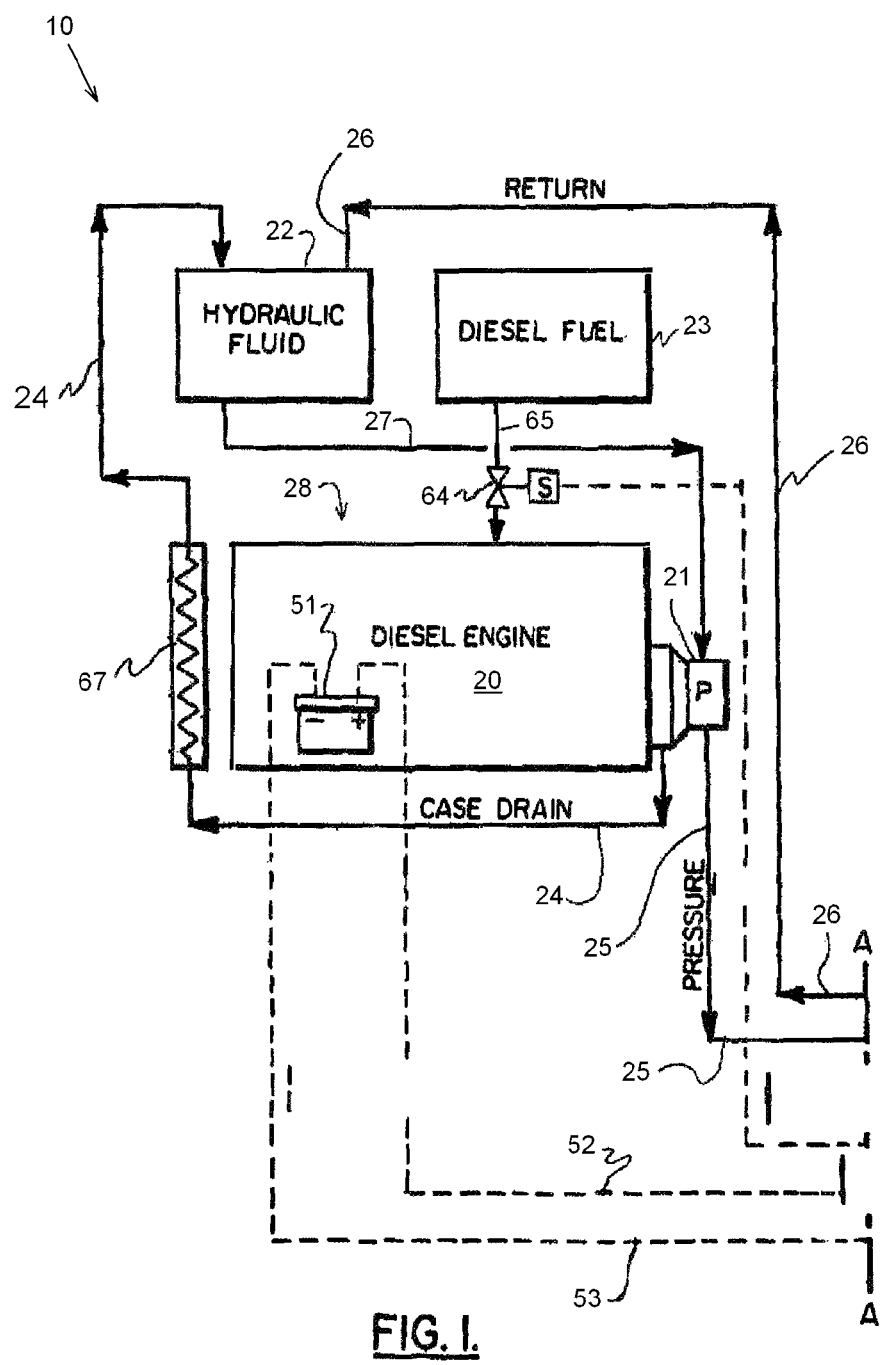
FIG. 1 is a schematic diagram of a preferred embodiment of the apparatus of the present invention.

FIGS. 1-12 show a preferred embodiment of the leak detection system apparatus of the present invention designated generally by the numeral 10. In the system 10 shown in FIG. 1, the prime mover is a diesel engine 20. In system 10A of FIG. 3, the prime mover is an electric motor 50. Leak detection system 10 (or 10A) is used in a marine underwater environment when operating a hydraulic device or shear 11.

Figure 2:
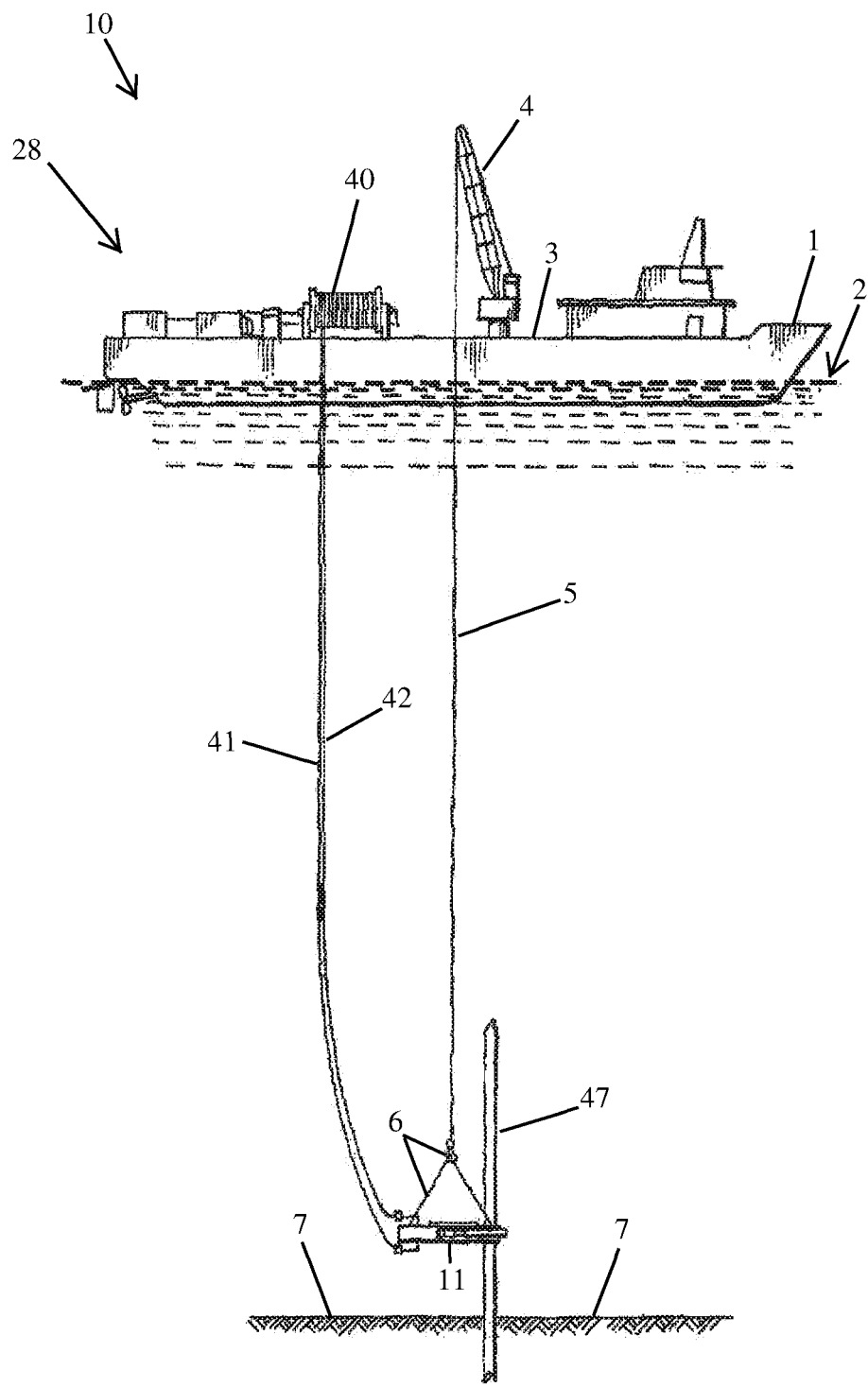
FIG. 2 is an elevation view of a preferred embodiment of the apparatus of the present invention.

In FIG. 2, a marine vessel 1 floats on a water surface 2. A water bottom or seabed 7 has an object 47 to be removed, such as a pipe or other object embedded in or located at seabed 7. In some cases, object 47 is the remnant of a damaged or abandoned offshore marine platform (e.g., oil and gas well production platform).

Deck area 3 on vessel 1 has a crane 4 with lifting line 5 and rigging 6 to enable lifting and lowering of hydraulic device 11. The hydraulic device shown in FIG. 1 is a hydraulic shear 11 having a jaw 14 that is moved between open and closed positions with a hydraulic cylinder 12 (see FIGS. 1A, 4-5). Device 11 can have a fixed jaw 59. Jaw 14 is pivotally attached at 60 to body 13. Cylinder 12 is attached to body 13 at pivotal connection 61 and to jaw 14 at pivotal connection 62. Jaw 14 moves from the open position of FIGS. 1A and 4 to the closed position (cutting position) of FIGS. 1B and 5 by extension of pushrod 15 and cylinder 19 relative to one another (see arrow 63, FIG. 5). Also, notice arrows 48, 49 in FIGS. 1A, 1B which illustrate such movement of jaw 14.

The hydraulic device 11 provides a body 13 that supports the moving jaw 14. Hydraulic cylinder 12 has a pushrod 15 that moves between extended (FIG. 5) and retracted (FIG. 4) positions. The hydraulic cylinder 12 provides a cylinder 19 having an interior that includes chamber sections 17 and 18 (see FIGS. 6-7). The chamber sections 17 and 18 are on opposing sides of piston 16. The chamber section 17 is on the side of piston 16 that has pushrod 15 as shown. The chamber section 18 does not have the pushrod 15 and thus is of a larger cross sectional area (see example 1 below).

Figure 1A:
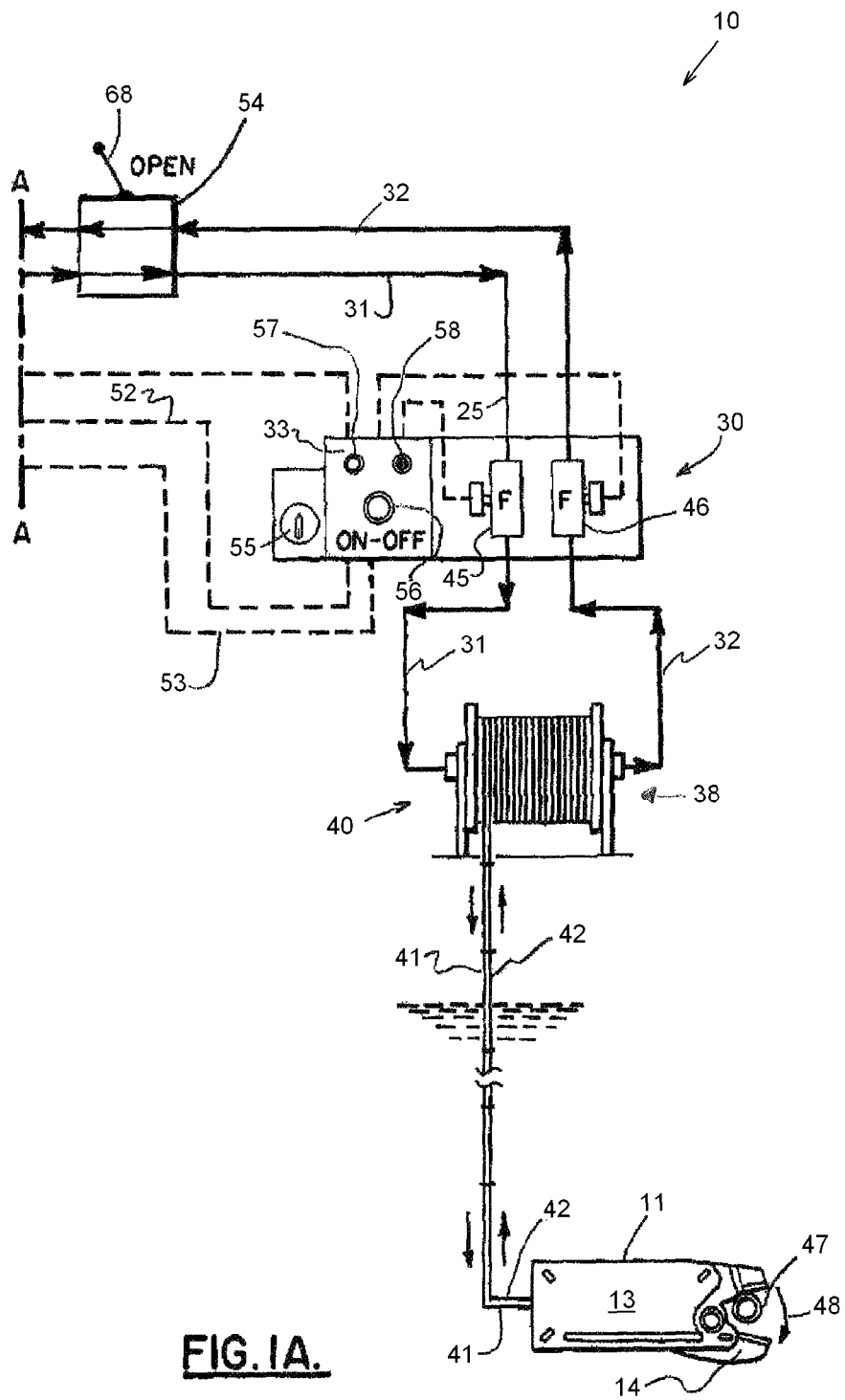
FIGS. 1A and 1B are partial flow diagrams of a preferred embodiment of the apparatus of the present invention wherein lines A-A on FIGS. 1A, 1B are match lines that match with lines A-A of FIG. 1.
Figure 1B:
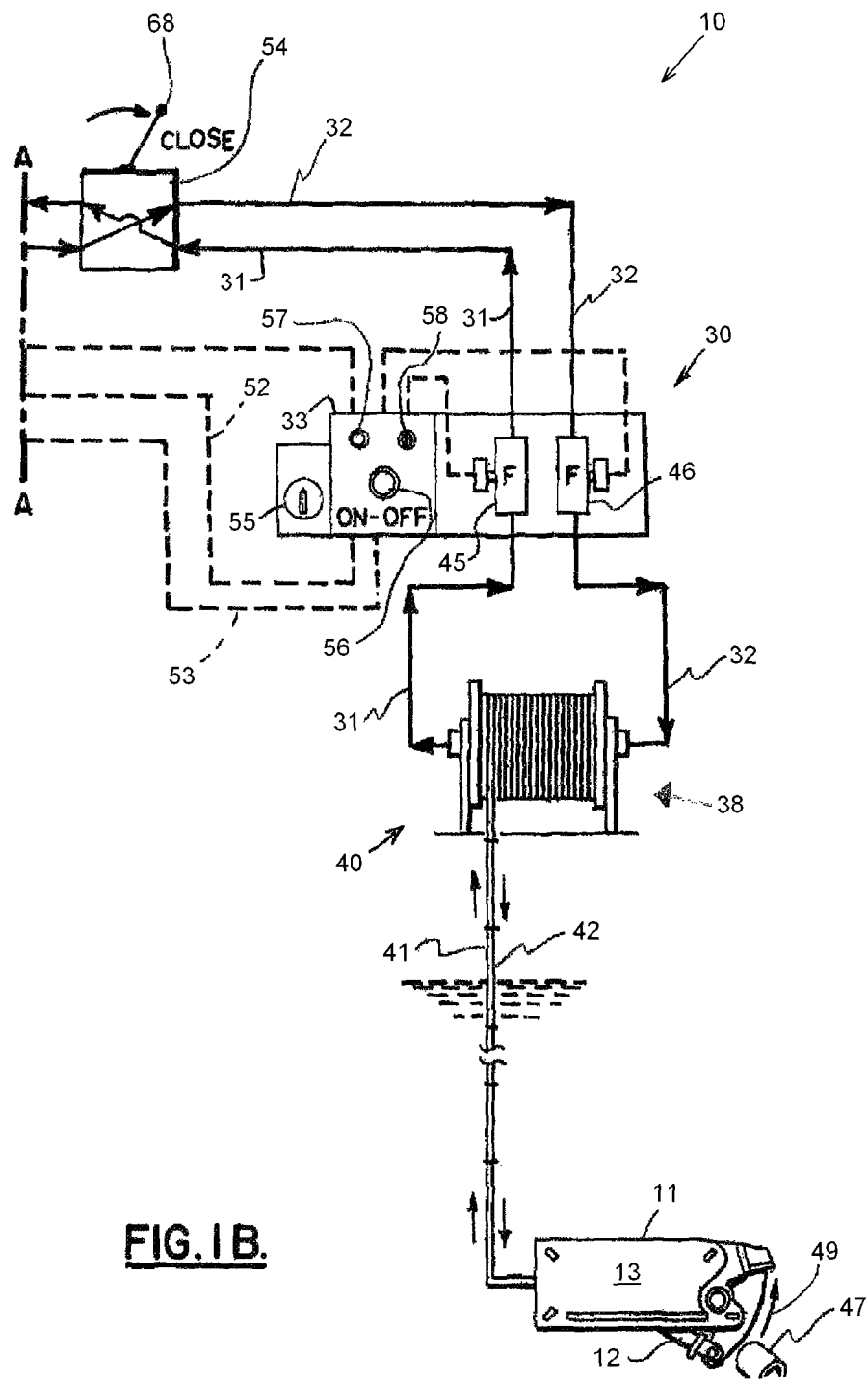

Hydraulic power is provided with a hydraulic power unit or HPU which is designated generally by the numeral 28 in FIGS. 1 and 2. Hydraulic power unit 28 includes a prime mover 20 which can be for example a diesel engine (20) or electric motor (50). The prime mover 20 powers a pump 21 which can be a compensating pump. Such compensating pump are commercially available (e.g. from Linde Hydraulics (www.lindeamerica.com)). The pump 21 receives hydraulic fluid from reservoir 22 and flow line 27. A case drain line or recycle line 24 is provided for bypassing the hose reel 40 which is a condition that can occur with such a compensating pump 21 in some situations. Fuel is provided for the hydraulic power unit 28, for example to tank 23 which can be a diesel fuel tank for supplying diesel fuel via flow line 65 to prime mover/diesel engine 20. (See FIGS. 1-1B.) Pump 21 has a discharge flow line 25 which is a pressure line that communicates with hydraulic control valve 54. Hydraulic control valve 54 has a lever or operator handle 68 that is operated to either open or close the jaw 14. In FIG. 1A, the lever or handle 68 is in a position that transmits fluid to lines 31, 32 so that jaw 14 is opened. In FIG. 1B, the lever or handle 68 is moved to a position that transmits fluid to lines 31, 32 so that jaw 14 is closed. Valve 54 is commercially available such as from Hawe North America, Inc. of Charlotte, N.C.

From control station 30, the line 31 which supplies pressurized hydraulic fluid to hose reel 40. A first flow meter 45 is placed in flow line 31 or at the junction of flow lines 25, 31 as shown in FIGS. 1A, 1B.

Line 32 also receives flow from control station 30. Return flow line 32 communicates with hose reel 40. The flow line 32 carries a second flow meter 46. Return flow is able to travel from the hose reel 40 to the flow line 32 through the flow meter 46 and then to the control station 30. From the control station 30, the flow in line 32 communicates with the return line 26 for returning fluid to hydraulic tank or reservoir 22. Flow meters 45, 46 can be commercially available CT Series flow meters from Webster Instruments of Milwaukee, Wis.

Figure 6:
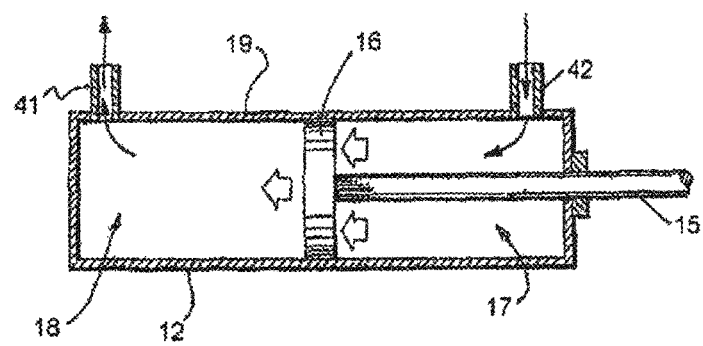
FIG. 6 is a schematic view of a preferred embodiment of the apparatus of the present invention.
Figure 7:
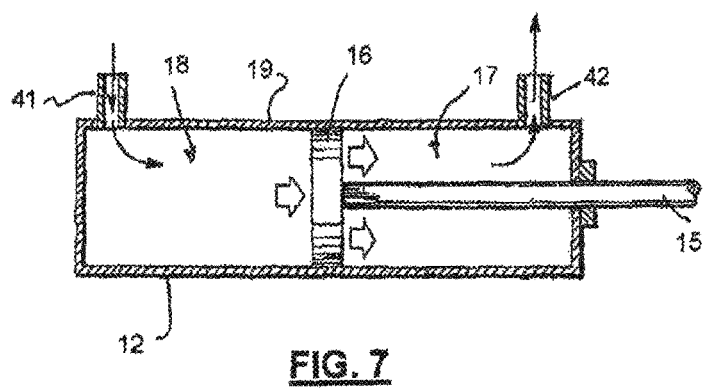
FIG. 7 is a schematic view of a preferred embodiment of the apparatus of the present invention.

The hose reel 40 provides flow lines 41, 42 which enable the hydraulic cylinder 12 to either open jaw 14 or close jaw 14 by either extending pushrod 15 or retracting the pushrod 15 (see FIGS. 4-5 and 6-7). This is accomplished by connecting one flow line 41 to cylinder 19 on one side of piston 16 and by connecting the other flow line 42 to cylinder 19 on the other side of the piston 16 as shown in FIGS. 6-7.

Figure 3:
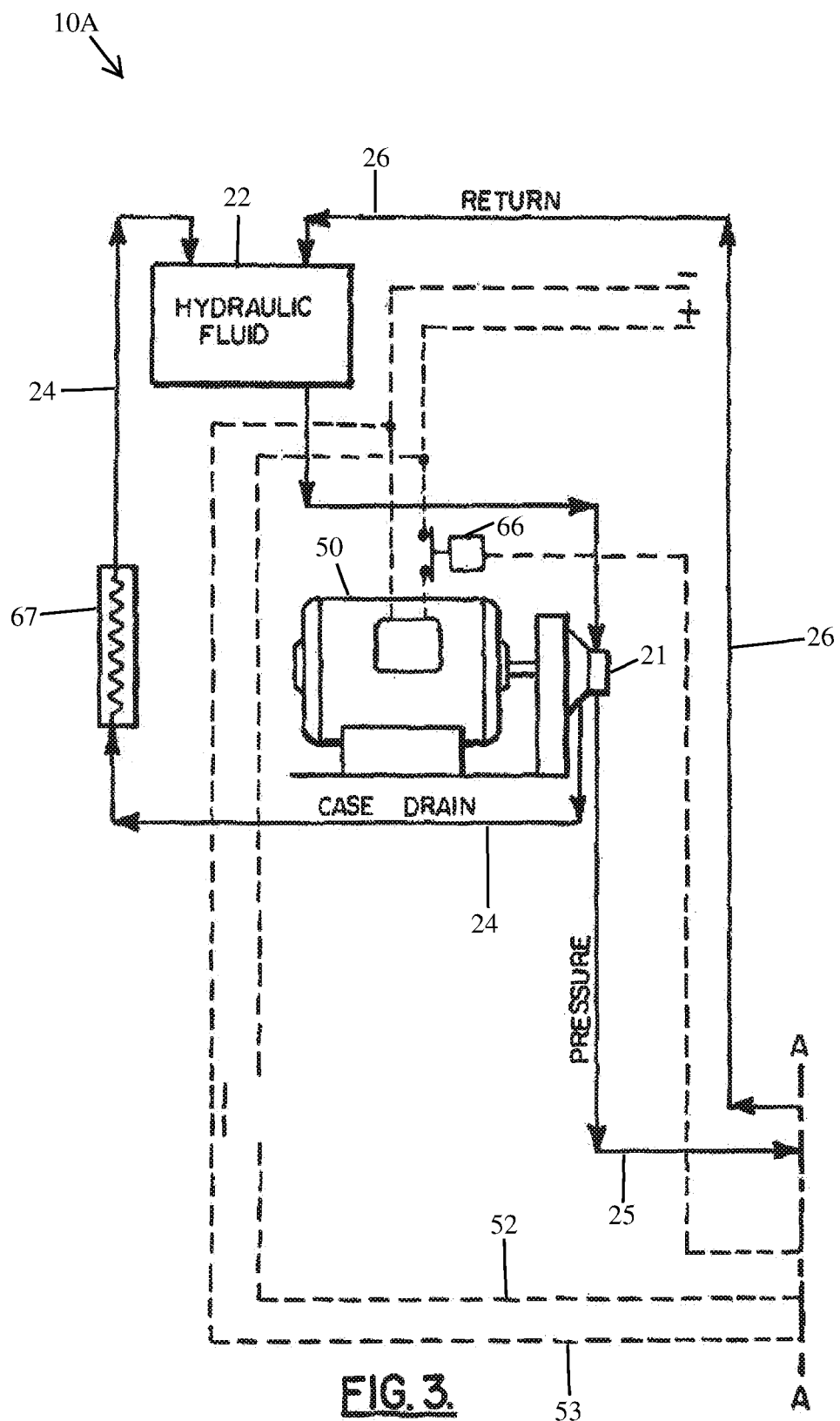
FIG. 3 is a flow diagram view of an alternate embodiment of the apparatus of the present invention providing an electrical motor drive and wherein match lines A-A of FIG. 3 match with either FIG. 1A or 1B at match lines A-A of FIG. 1A or 1B.
Figure 4:
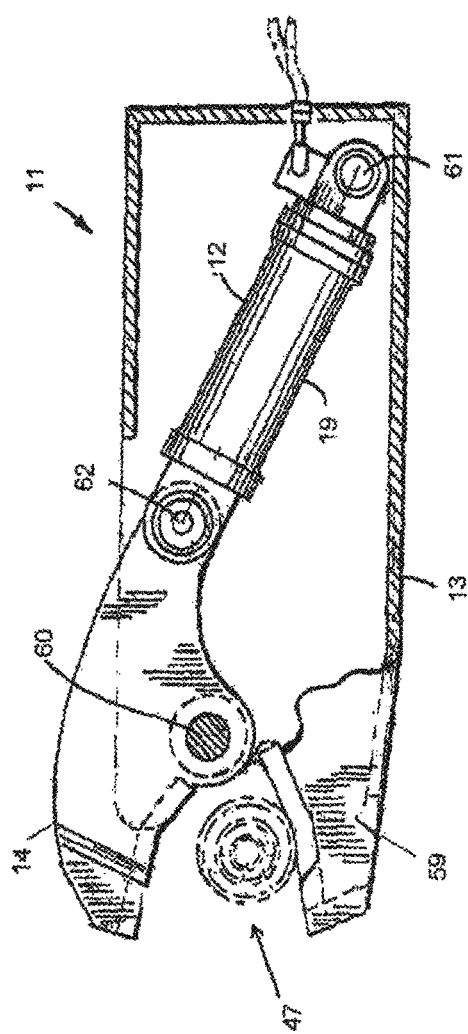
FIG. 4 is a partial schematic view of a preferred embodiment of the apparatus of the present invention illustrating the hydraulic device with jaws in an open position.
Figure 5:
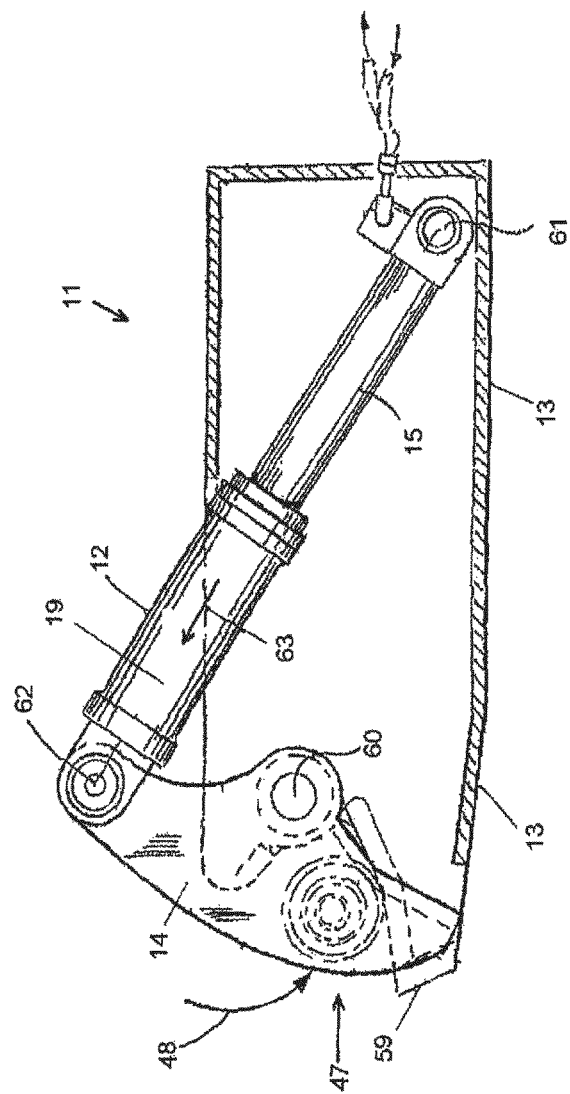
FIG. 5 a partial schematic view of a preferred embodiment of the apparatus of the present invention illustrating the hydraulic device with jaws in a closed position.

FIGS. 1 and 3 illustrate that the prime mover can be either an engine 20 or an electric motor 50. In FIG. 1, the diesel engine 20 is provided with a battery 51 for starting the engine 20. The battery 51 also provides positive and negative leads 52, 53 that communicate with controller 30 as shown in FIG. 1A. The control station 30 of 1A can include a commercially available computer or controller 33 such as a Model Plus 1 from Sauer Danfoss such as Model No. MC024-010 or MC024-012.

In FIG. 1A, the computer or controller 33 is part of the control station 30. The control station 30 can provide a key switch for enabling the control station 30 to be activated or deactivated. A rotary cam switch 55 can be provided to pre-program controller 33 for a number of different configurations (e.g., dimensional changes) of cylinder 19, pushrod 15, chamber sections 17, 18. (See FIGS. 4-7.) The cam switch enables an operator to dial in or select a particular cylinder by selecting a pre-programmed cam switch position. Such a rotary cam switch is commercially available from Control Switches International, Inc.

A start button 56 can be provided for enabling use of control station 30. Lamps 57, 58 can be provided to indicate whether or not the control station 30 has been activated or is deactivated. For the diesel engine 20, a solenoid operated valve 64 is provided in flow line 65 which supplies diesel fuel from tank 23 to engine 20. (See FIG. 1.) This solenoid operated valve 64 is closed in a situation where a leak is detected. For the electric motor 50, a solenoid operated switch 66 is provided. (See FIG. 3.) The switch 66 deactivates electric motor 50 if a leak situation is detected. For each of the diesel engine 20 and electric motor 50, a cooler 67 can be provided in the flow line 24 as shown.

In one embodiment, the method and apparatus can be provided with a display which may include a leak detection visual and/or audible alarm. A display console can be provided for controller 33 which can include a selector switch 55, on off button 56, indicator lamps 57 and 58, along with default program button. Controller 33 can be operatively connected to a computer (e.g., a notebook computer) for programming operating values into controller regarding its operations.

FIGS. 1A and 1B are schematic block diagrams of leak detection system 10 connected to two hydraulic systems— (a) hydraulic shears 11 and (b) the reel drive motor 38 for hose reel 40. Leak detection system 10 can detect undesirable conditions in one or both of these two connected hydraulic systems.

A plurality of flow meters 45 and 46 can be used to measure flow to and from the monitored hydraulic systems (e.g., shears 11 and reel drive motor 38). The flow meter 45 sends a signal to controller 33 which is proportional to the rate of fluid flow in flow line 31. The flow meter 46 sends a signal to controller 33 which is proportional to the rate of fluid flow in flow line 32.

Pre-Leak Detection Testing

Leak detection 10 system can go through various pre-leak detection monitoring checks which are designed to ensure that the connected hydraulic systems (e.g., shears 11 and reel drive motor 38) are operating correctly. In one embodiment leak detection system 10 will shut off hydraulic power to the hydraulic pump 21 if one or more pre-monitoring exceptions are found.

Pre-monitoring exceptions can include, but are not limited to:
(a) powering hydraulic pump 21 not operating such as not rotating between a predefined rotational range;
(b) the level of hydraulic fluid in reservoir tank 22 not being above a predefined reservoir tank level;
(c) the pressure in flow line 31 not being above a predefined pressure for such flow line;
(d) the pressure in flow line 32 not being above a predefined pressure for such flow line
(e) the pressure in flow line 41 not being above a predefined pressure for such flow line; and
(f) the pressure in flow line 42 not being above a predefined pressure for such flow line.

If one or more of the above pre-monitoring exceptions are found, leak detection system 10 can turn off power to pump 21, and issue a warning signal indicating the identification of a pre-monitoring exception. The pressure exerted by the hydraulic fluid can be monitored by pressure transducers in flow lines 31, 32, 41, and 42.

If an exception condition is found, including satisfaction of the time periods for existence of such exception, the leak detection system 10 shuts down the identified leaking hydraulic system (e.g., shears 11 and/or reel drive motor 38). Shutting down a hydraulic system can include shutting off the flow of hydraulic fluid from the reservoir tank 22 to pump 21 and shutting off power to pump 21. The hydraulic fluid flow can be shut off at reservoir tank 22 by turning a valve in line 27 to a closed position.

If a leaking exception condition satisfying leaking parameters has been found, the leaking hydraulic system (e.g., shears 11 or reel drive motor 38) causing the leaking event to be identified may be shut down and the indicator or display signals are sent to console to warn that a leaking event has been identified. The leak detected light 58 can be turned on and optionally an auditory alarm can also be issued.

Leak Detection Monitoring

In one embodiment, following the completion of the various pre-leak detection monitoring checks, leak detection system 10 can monitor one or both connected hydraulic systems (shears 11 and/or reel drive motor 38) by monitoring flow though flow meters 45 and 46 and comparing such monitored flow to certain predefined flow amounts for the particular hydraulic system being monitored.

In one embodiment leak detection system 10 provides a predefined startup period of time from activation of a hydraulic system to beginning of monitoring operations of flow meters 45 and 46. Such predefined start up period of time allows the monitored hydraulic system time to stabilize before leak detection system 10 begins looking for leaking exceptions in monitoring conditions. In one embodiment such predefined start up period of time can be at least about 1, 2, 3, 4, 5, 6, 7, 8, 9, 10, 12, 14, 15, 18, 20, 25, 30, 35, 40, and/or 50 seconds. In various embodiments such predefined period of time can be a range between any two of the specified time periods.

Exceptions for leak detection can be identified by leak detection system 10 where a measured parameter falls outside of the predefined allowed ranged for such measured parameter. Additionally, preferably leak detection system 10 requires that the exception be present for a predetermined period of time before considering that an identified leaking exception is considered a leaking event and acting accordingly, such as by shutting down pump 21 and/or the hydraulic system (e.g., shears 11 or reel drive motor 38) causing the identified leaking exception to be present.

Frequency of Sampling Flow Meter Readings

In one embodiment leak detection system 10 can be user programmed regarding the frequency of sampling of which the system accepts signals from the plurality of flow meters 45 and 46. Although "continuous" is used in this specification it is anticipated that, in any given time period, only a finite number sampling of measurements can be taken by leak detection system 10.

In various embodiments embodiment sampling rates can be at least 1, 5, 10, 50, 100, 120, 150, 200, 300, 500, 1000, 2000, or 3000 Hertz. In various embodiments sampling rates can be a range between any two of the specified sampling rates.

Time Period for Existence of Leaking Exception

In one embodiment leak detection system 10 responds or reacts rapidly to an identified leaking event, such as by shutting off power to pump 21 along with shutting off fluid flow from reservoir 22 to pump 21. With the occurrence of such an event, leak detection system 10 can also issue a warning signal such as be lighting lamp 57 or lamp 58, along with possibly issuing a audible warning signal such as a siren.

In one embodiment, after a leaking event is determined, leak detection system 10 will shut down the flagged hydraulic system (shears 11 or reel drive motor 38). This can occur after determining a leaking exception exists for a predetermined time. In one embodiment such predefined period of time that the leaking exception must exist before a leaking event can be identified, can be at least about 1, 2, 3, 4, 5, 6, 7, 8, 9, 10, 12, 14, 15, 18, 20, 25, 30, 35, 40, 50, and/or 60 seconds. In various embodiments such predefined period of time can be a range between any two of the specified time periods. In various embodiments the user can program this predefined period of time and/or range into leak detection system 10.

Programming Based on Actual Operating Conditions of Hydraulic Systems in a Non-Leaking Condition In one embodiment benchmark conditions in a known non-leaking conditions to be expected when taking sampling measurements can be automatically programmed into the method and apparatus. In one embodiment predefined exception conditions can be programmed into leak detection system 10 based on actual operating conditions of the hydraulic system being monitored (e.g., shears 11 and/or reel drive motor 38). In one embodiment, the default predefined button can be provided in leak detection system 10, and a method of programming predefined conditions for flow meters 45 and 46 can be as follows:

(1) Shear System

With hydraulic shear system 11, hydraulic power can be supplied by pump 21 though lines 31 and 32 which respectively flow through lines 41 and 42. The ratio of flow measured by flow meter 45 to compared to flow meter 46 (or vice versa) can be calculated by controller 33 and such ratio be set in the method and apparatus as the ideal predefined ratio in a non-leaking condition.

As best can be seen in FIGS. 6 and 7, for any particular movement of piston 16 inside of cylinder 19, the amount of hydraulic fluid entering/leaving chamber section 17 is less than the amount of hydraulic fluid entering/leaving chamber section 18. The difference is a result of pushrod 15 taking up part of the volume of chamber section 17. Although not expected to be a 1:1 ratio, because pushrod 15 has a substantially uniform cross sectional area the ratio of the amount of fluid exchange between the two chamber sections is expected to be constant regardless of the position of piston 16 in cylinder 19. In a preferred embodiment the ratio can be 1:2.28 and measured variations from this ratio can be used by leak detection system 10 to identify leaking exceptions for shear 11, and if such identified leaking exception persists, a leaking event for shear 11.

(2) Driving Motor for Hose Reel

For reel drive motor 38 hydraulic power can be supplied by pump 21 though lines 31 and 32 which power reel drive motor 38 to outlay or take up lines 41 and 42. The ratio of flow measured by flow meter 45 to 46 can be calculated by controller 33 and such ratio be set as a predefined ratio in a non-leaking condition. However, this ratio in a non-leaking situation is expected to be 1:1 and this step can be omitted for programming the leak detection parameters for reel drive motor 38.

Unlike shears 11, reel drive motor 38 operably connected to hose reel 40 (and rotating reel 40 to outlet and take up of flow lines 41 and 42) will have input and output lines which, in a non-leaking condition, are expected to have a 1:1 ratio of hydraulic fluid entering and exiting driving motor 38.

Use of Physical Dimensional Parameters to Calculate Predefined Ratios

As best can be seen in FIGS. 6 and 7, for any particular movement of piston 16 inside of cylinder 19, the amount of hydraulic fluid entering/leaving chamber section 17 is less than the amount of hydraulic fluid entering/leaving chamber section 18. The difference is a result of pushrod 15 taking up part of the volume of chamber section 17. Although not expected to be a 1:1 ratio, because pushrod 15 has a substantially uniform cross sectional area the ratio of the amount of fluid exchange between the two chamber sections is expected to be constant regardless of the position of piston 16 in cylinder 19. In a preferred embodiment the ratio can be 1:2.28 and measured variations from this ratio can be used by leak detection system 10 to identify leaking exceptions for shear 11, and if such identified leaking exception persists, a leaking event for shear 11.

In one embodiment, where the push rod has a diameter $D_r$ and the piston has a diameter $D_p$ the ratio between the two flow rates will be the same as the ratio of the cross sectional areas on either side of the piston, and can be calculated by the formula:

$$\frac{[D_p^2 - D_r^2]}{D_p^2}$$

In this embodiment a user can enter the diameter of the rod "$D_r$" and the diameter of the piston "$D_p$" and the method and apparatus can calculate the ideal predefined ratio in a non-leaking condition from which allowable variations can be looked for by the method and apparatus.

Customizing Allowable Variations from Predefined Non-Leaking Ratios

In various embodiments a user can custom program leak detection system 10 to allow a variation of a selected amount from the predefined ratio in a non-leaking condition for either the hydraulic shear system 11 and/or reel drive motor 38. In various embodiments such can be a symmetrical variation from the initial predefined ratio can be an allowable percentage variation from the initial predefined ratio. In various embodiments this allowable percentage can be at least about 0.1, 0.5, 1, 2, 3, 4, 5, 6, 7, 8, 9, 10, 12, 14, 15, 18, 20, 25, 30, 35, 40, and/or 50 percent. In various embodiments such exception variations can differ from variations above compared to variations below the user selected value in a non-leaking condition (e.g., the initial predefined ratio).

In various embodiments the lower limit can be one of the specified allowable variations, and the upper limit can be a different one of the specified allowable variations.

In various embodiments such user selected predefined parameters may be changed from time to time as the user desires.

At different points in time the user can use the default program button to calculate another predefined ratio for either hydraulic system (shear 11 or drive motor 38) as either hydraulic system's non-leaking characteristics may change over time. In one embodiment such predefined variations can be numerically entered into controller 33 by a computer.

As disclosed herein it is anticipated that leak detection system 10 can have programmed multiple sets of ratios for flow in flow meters 45 and 46 based on the different hydraulic systems which flow meters 45 and 46 are measuring flow in relation to. For example, when reel drive motor 38 is operating to lay out or take up hoses 41 and 42 (respectively lowering or raising shears 11), hydraulic shears 11 will not be operating. Accordingly, the values programmed for reel drive motor 38 are used by leak detection system 10.

Catastrophic Leak Detection Testing

During operations leak detection system 10 system can go through various checks for catastrophic leaking events which are designed to ensure that the connected hydraulic systems (e.g., shears 11 and reel drive motor 38) do not suffer a catastrophic leaking event. In one embodiment leak detection system 10 will shut off hydraulic power to the hydraulic pump 21 and/or hydraulic systems if one or more pre-monitoring exceptions are found.

Catastrophic monitoring exceptions can include, but are not limited to:
(a) no flow read by flow meter 45 while flow is read by flow meter 46;
(b) no flow read by flow meter 46 while flow is read by flow meter 45;
(c) the pressure in flow line 31 not being above a predefined pressure for such flow line;
(d) the pressure in flow line 32 not being above a predefined pressure for such flow line
(e) the pressure in flow line 41 not being above a predefined pressure for such flow line; and
(f) the pressure in flow line 42 not being above a predefined pressure for such flow line.

If one or more of the above catastrophic leak detection monitoring exceptions are found, leak detection system 10 can turn off power to pump 21, shut down the hydraulic systems, and issue a warning signal indicating the identification of a catastrophic leak detection event. The pressure exerted by the hydraulic fluid can be monitored by pressure transducers in flow lines 31, 32, 41, and 42.

The following example illustrates the continuous calculation of a ratio of one chamber section 17 and the other chamber section 18. In the Example 1 below, the computer or controller 33 of control station 30 continuously calculates the ratio of fluid that enters or departs from the chamber 18 and compares that volume of fluid with the volume of fluid that enters or departs from the chamber section 17. The flow meters 45, 46 provide data to the controller or computer 33. If the computer 33 calculates that the ratio of the volume of fluid entering and exiting the cylinders differs from a ratio for example of 2.28:1 in the following example, the computer knows that a leak has occurred and it sends a signal to the solenoid valve 64 to shut off the flow of diesel fuel to the engine 20 thus deactivating the engine 20. In the case of an electric motor 50, the computer or controller 33 sends a signal to the solenoid operated switch 66 which deactivates the electric motor 50.

Example 1

An exemplary hydraulic cylinder could have the following dimensions:

Cylinder bore=8 inches (20 cm), cylinder rod=6 inches (15 cm), cylinder stroke=20.5 inches (52 cm)

For this system, shutdown occurs when the difference in volume entering and exiting the cylinder is different from the ratio between the cylinder piston area and the cylinder annulus area. The annulus area is equal to the piston area minus the rod area. The computer or controller 33 which is part of the control system 30 compensates for this difference in volume, continuously calculating the ratio based upon input from the flow meters 45, 46. The computer or controller 33 can be a commercially available "Plus +1" controller available from Sauer-Danfoss (e.g. models MC024-010 or MC024-012).

The piston end volume is equal to the Cylinder Piston Area times the Cylinder Stroke Cylinder piston area=Piston Diameter squared times a constant of (0.7845)

8" (20 cm) squared (x) 0.7854=50.26 sq. in. (324.26 sq. cm)

Piston End Volume=50.26 sq. in. (324.26 sq. cm) (x) 20.5 in. (52 cm)=1030.33 cu. in. or 4.46 gallons (16,884.1 cu. cm)

The Rod end volume is equal to the Cylinder Annulus Area times the Cylinder Stroke Rod Area=6" (15 cm) squared (x) 0.7854=28.27 sq. in. (182.39 sq cm)

Cylinder Annulus=50.26 sq. in. (324.26 sq. cm) (–) 28.27 sq. in. (182.39 sq cm)=21.99 sq. in. (141.87 sq. cm)

Rod End Volume=21.99 sq. in. (141.87 sq. cm) (x) 20.5 in. (52 cm)=450.79 cu. in. or 1.95 gallons (7,381.6 cu. cm)

The ratio between the Piston End volume and the Rod End volume is (2.28:1)

Under normal operations with no leak present, the volume entering and exiting the cylinder will differ by the ratio of (2.28:1). If a leak occurs, the computer or controller 33 will then calculate a ratio that is not 2.28:1 and stop the prime mover, 20 or 50.

Thus, if at any time the ratio of volume entering and exiting the cylinder is a value that is different from the ratio of (2.28:1) the controller or computer 33 will send a signal to shut down the diesel engine or electric motor and thus the hydraulic device 11. FIGS. 8-11 are schematic diagrams of the prime mover 20 and hose reel 40. FIG. 12 shows examples of hydraulically operated devices and components 70, 71, 72, 73, 74.

Figure 8:
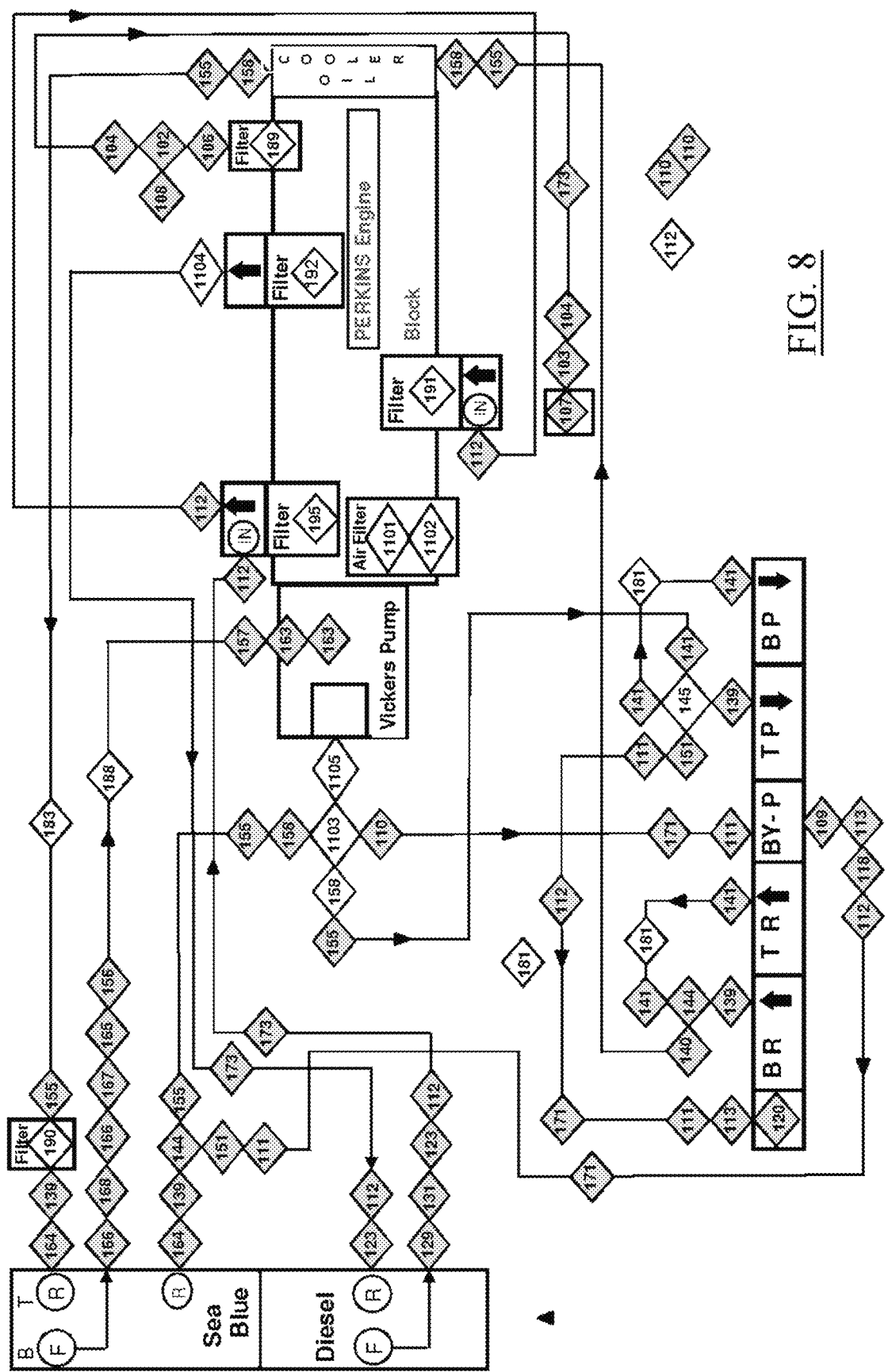
FIGS. 8-10 are diagrams of the prime mover portion of a preferred embodiment of the apparatus of the present invention.

The following is a list of parts that correspond to FIG. 8:

| QTY | Parts # | Description |
| --- | --- | --- |
| 1 | 102 | ⅛" FM TEE NPT Brass |
| 1 | 103 | ⅛" FM × FM NPT 90* Brass |
| 2 | 104 | ¼" M JIC × ⅛" M NPT 90* Brass |
| 1 | 106 | ⅛" M × M NPT Hex Nip. Brass |
| 1 | 107 | ⅛" NPT100 PSI Murphy gauge(oil pres.) |
| 1 | 108 | ¼" Oil Pressure Switch |
| 1 | 109 | ¼" M × M NPT Hex Nip 6K |
| 1 | 110 | ¼" M Jic × ¼" Boss w/Jam Nut 90* 6K |
| 4 | 111 | ¼" M Jic × ¼" M NPT Hex Nip 6K |
| 7 | 112 | ¼" M Jic × ¼" M NPT 90* 6K |
| 2 | 113 | ¼" FM × FM Collar NPT 6K |
| 1 | 118 | ¼" M × FM NPT Needle Valve (102 FMG) |
| 1 | 120 | ¼" NPT 10000 PSI gauge (Flush Mount) |
| 2 | 123 | ¼" × ½" Bushing NPT 6K |
| 1 | 129 | ½" M × M NPT Hex Nip 6K |
| 1 | 131 | ½" FM × FM NPT Gate Valve Brass |
| 4 | 139 | 1" M × M NPT Hex Nip 6K |
| 1 | 140 | 1" M Jic × 1" M NPT 45* 6K |
| 5 | 141 | 1" M Jic × 1" M NPT Hex Nip 6K |
| 2 | 144 | 1" Tee NPT 6K |
| 2 | 151 | ¼" × 1" NPT Bushing 6K |
| 6 | 155 | 1" M NPT × 1" M Jic 90* 6K |
| 1 | 156 | 1¼" M NPT × 1¼" M Jic Hex Nip 6K |
| 1 | 157 | 1¼" M NPT × 1¼" M Jic 90* 6K |
| 3 | 158 | 1¼" × 1" NPT Bushing 6K |
| 1 | 163 | 1½" × 1¼" NPT Bushing 6K |
| 2 | 164 | 1½" × 1" NPT Bushing 6K |
| 1 | 165 | 3" × 1¼ Bushing NPT |
| 2 | 166 | 3" All thread Sch. 80 NIP. |
| 1 | 167 | 3" Hydraulic Oil Strainer FM × FM NPT |
| 1 | 168 | 3" FM × FM NPT Gate Valve Brass |
| 3 | 171 | ¼" FM × FM Jic 6K JJ Crimp 2' 6" |
| 3 | 173 | ¼" FM × FM Jic Fuel line 7' |
| 5 | 181 | 1" FM × FM Jic 6K JJ crimp 4' |
| 1 | 183 | 1" FM × FM Jic 6K JJ crimp 11' |
| 1 | 188 | 1¼" FM × FM Jic 6K JJ crimp 14' |
| 1 | 189 | BT 216 Oil filter (Baldwin) |
| 1 | 190 | BT 387 Hydrauic return filter (Baldwin) |
| 1 | 191 | BF-7681-D Fuel filter primary (Baldwin) |
| 1 | 192 | BF-7674-D Fuel filter secondary (Baldwin) |

-continued

| QTY | Parts # | Description |
|---|---|---|
| 1 | 195 | R20P Racor filter |
| 1 | 1101 | RS3542 Outer air filter (Baldwin) |
| 1 | 1102 | RS3543 Inner air filter (Baldwin) |
| 1 | 1103 | Relief valve CT 10 F 30 |
| 1 | 1104 | ¼"M Jic × ¼" FM Compression |
| 1 | 1105 | 1¼ M × M NPT Hex Nip |
| 1 | 1106 | 2" × 1½" NPT Bushing 6K |
| 2 | 1107 | Gates 9525 |

Figure 9:
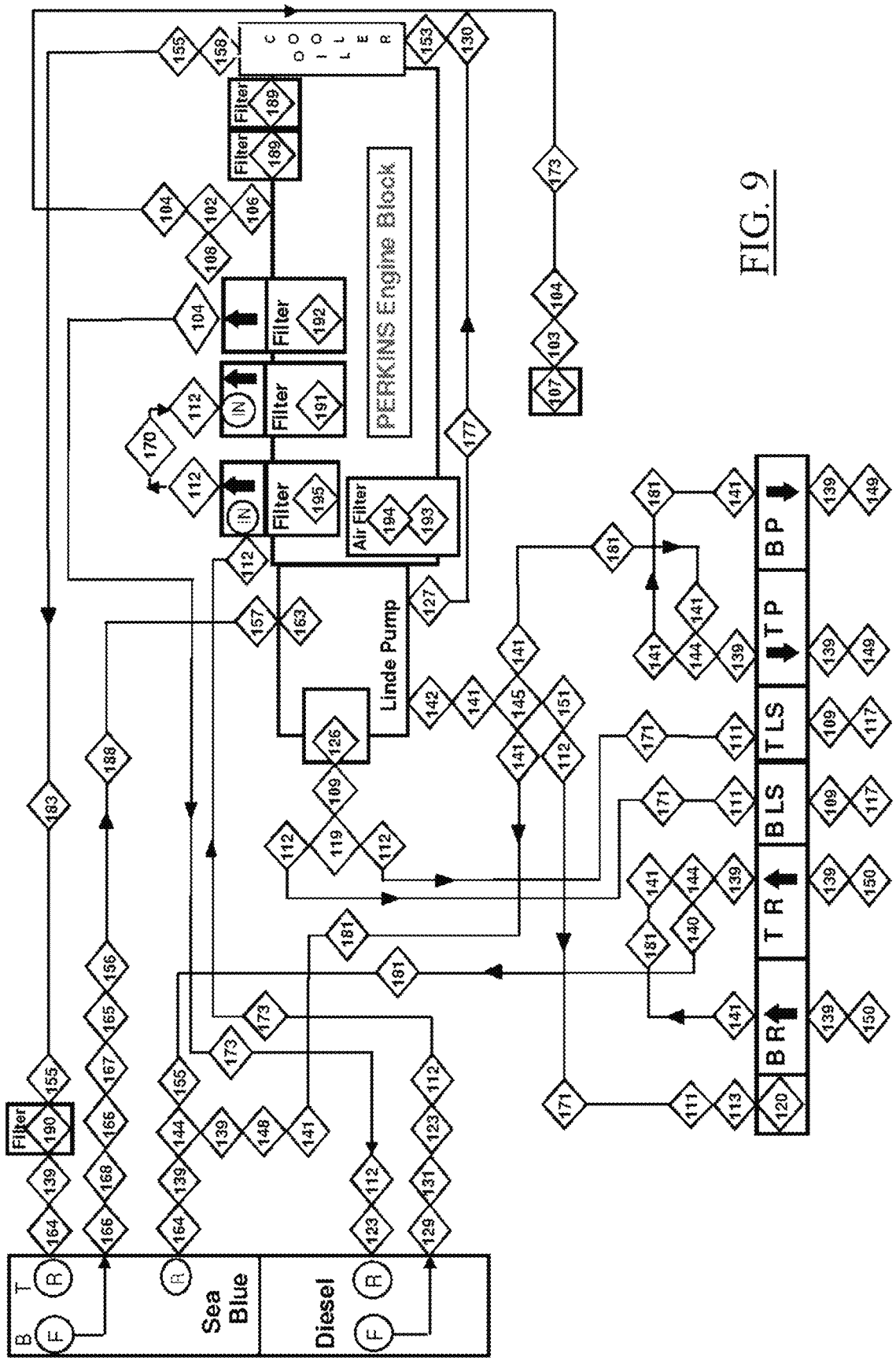

The following is a list of parts that correspond to FIG. 9:

| QTY | Parts # | Description |
|---|---|---|
| 1 | 102 | ⅛" FM TEE NPT Brass |
| 1 | 103 | ⅛" FM × FM NPT 90* Brass |
| 2 | 104 | ¼" M JIC × ⅛" M NPT 90* Brass |
| 1 | 106 | ⅛" M × M NPT Hex Nip. Brass |
| 1 | 107 | ⅛" NPT100 PSI Murphy gauge(oil pres.) |
| 1 | 108 | ¼" Oil Pressure Switch |
| 3 | 109 | ¼" M × M NPT Hex Nip 6K |
| 3 | 111 | ¼" M Jic × ¼" M NPT Hex Nip 6K |
| 8 | 112 | ¼" M Jic × ¼" M NPT 90* 6K |
| 1 | 113 | ¼" FM × FM Collar NPT 6K |
| 2 | 117 | ¼" M Stucci × FM NPT |
| 1 | 119 | ¼" FM NPT Shuttle Valve |
| 1 | 120 | ¼" NPT 10000 PSI gauge (Flush Mount) |
| 2 | 123 | ¼" × ½" Bushing NPT 6K |
| 1 | 126 | ¼" FM NPT × 14 mm M thread 6K |
| 1 | 127 | ½" M Jic × 22 × 1.5 mm M thread 6K |
| 1 | 129 | ½" M × M NPT Hex Nip 6K |
| 1 | 130 | ½"Jic × ½" NPT 90* 6K |
| 1 | 131 | ½" FM × FM NPT Gate Valve Brass |
| 9 | 139 | 1" M × M NPT Hex Nip 6K |
| 1 | 140 | 1" M Jic × 1" M NPT 45* 6K |
| 9 | 141 | 1" M Jic × 1" M NPT Hex Nip 6K |
| 1 | 142 | 1" FM Jic × 3/4" M NPT Hex Nip 6K |
| 3 | 144 | 1" Tee NPT 6K |
| 1 | 145 | 1" FM NPT 4-Way |
| 1 | 148 | 1" Ball Valve 306-S 6K |
| 2 | 149 | 1" M Stucci × FM NPT |
| 2 | 150 | 1" FM Stucci × FM NPT |
| 1 | 151 | ¼" × 1" NPT Bushing 6K |
| 1 | 153 | 1¼" × ½" NPT Bushing 6K |
| 3 | 155 | 1" M NPT × 1" M Jic 90* 6K |
| 1 | 156 | 1¼" M NPT × 1¼" M Jic Hex Nip 6K |
| 1 | 157 | 1¼" M NPT × 1¼" M Jic 90* 6K |
| 1 | 158 | 1¼" × 1" NPT Bushing 6K |
| 1 | 163 | 1½" × 1¼" NPT Bushing 6K |
| 2 | 164 | 1½" × 1" NPT Bushing 6K |
| 1 | 165 | 3" × 1¼ Bushing NPT |
| 2 | 166 | 3" All thread Sch. 80 NIP. |
| 1 | 167 | 3" Hydraulic Oil Strainer FM × FM NPT |
| 1 | 168 | 3" FM × FM NPT Gate Valve Brass |
| 1 | 170 | ¼" FM × FM Jic 6K Blue Fuel line 1' 2" |
| 3 | 171 | ¼" FM × FM Jic 6K JJ Crimp 2' 6" |
| 3 | 173 | ¼" FM × FM Jic Fuel line 7' |
| 1 | 177 | ½" FM × FM Jic 6K JJ Crimp 7' |
| 5 | 181 | 1" FM × FM Jic 6K JJ crimp 4' |
| 1 | 183 | 1" FM × FM Jic 6K JJ crimp 11' |
| 1 | 188 | 1¼" FM × FM Jic 6K JJ crimp 14' |
| 2 | 189 | BT 216 Oil filter (Baldwin) |
| 1 | 190 | BT 387 Hydrauic return filter (Baldwin) |
| 1 | 191 | BF-7681-D Fuel filter primary (Baldwin) |
| 1 | 192 | BF-7674-D Fuel filter secondary (Baldwin) |
| 1 | 193 | RS3544 Outer air filter (Baldwin) |
| 1 | 194 | RS3545 Inner air filter (Baldwin) |
| 1 | 195 | R20P Racor filter |
| 1 | 1104 | ¼"M Jic × ¼" FM Compression |

Figure 10:
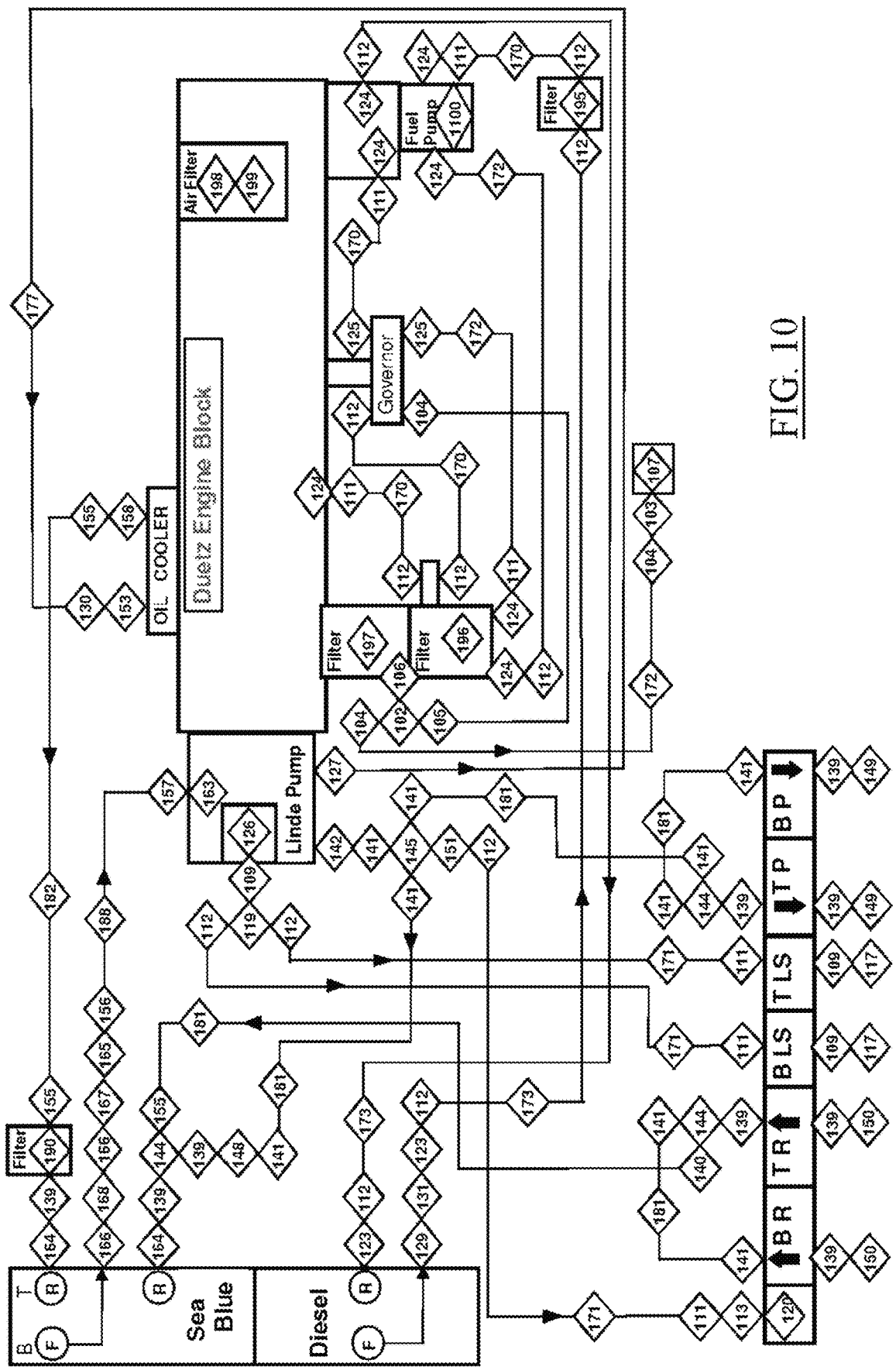

The following is a list of parts that correspond to FIG. 10:

| QTY | Parts # | Description |
|---|---|---|
| 1 | 102 | ⅛" FM TEE NPT Brass |
| 1 | 103 | ⅛" FM × FM NPT 90* Brass |
| 3 | 104 | ¼" M JIC × ⅛" M NPT 90* Brass |
| 1 | 105 | ¼" M JIC × ⅛" M NPT 45* Brass |
| 1 | 106 | ⅛" M × M NPT Hex Nip. Brass |
| 1 | 107 | ⅛" NPT100 PSI Murphy gauge(oil pres.) |
| 3 | 109 | ¼" M × M NPT Hex Nip 6K |
| 7 | 111 | ¼" M Jic × ¼" M NPT Hex Nip 6K |
| 12 | 112 | ¼" M Jic × ¼" M NPT 90* 6K |
| 1 | 113 | ¼" FM × FM Collar NPT 6K |
| 2 | 117 | ¼" M Stucci × FM NPT |
| 1 | 119 | ¼" FM NPT Shuttle Valve |
| 1 | 120 | ¼" NPT 10000 PSI gauge (Flush Mount) |
| 2 | 123 | ¼" × ½" Bushing NPT 6K |
| 7 | 124 | Banjo ¼" FM NPT |
| 2 | 125 | ⅜" M Jic × ¼" M NPT 90* 6K |
| 1 | 126 | ¼" FM NPT × 14 mm M thread 6K |
| 1 | 127 | ½" M Jic × 22 × 1.5 mm M thread 6K |
| 1 | 129 | ½" M × M NPT Hex Nip 6K |
| 1 | 130 | ½"Jic × ½" NPT 90* 6K |
| 1 | 131 | ½" FM × FM NPT Gate Valve Brass |
| 9 | 139 | 1" M × M NPT Hex Nip 6K |
| 1+ | 140 | 1" M Jic × 1" M NPT 45* 6K |
| 9 | 141 | 1" M Jic × 1" M NPT Hex Nip 6K |
| 1 | 142 | 1" FM Jic × ¾" M NPT Hex Nip 6K |
| 3 | 144 | 1" Tee NPT 6K |
| 1 | 145 | 1" FM NPT 4-Way |
| 1 | 148 | 1" Ball Valve 306-S 6K |
| 2 | 149 | 1" M Stucci × FM NPT |
| 2 | 150 | 1" FM Stucci × FM NPT |
| 1 | 151 | ¼" × 1" NPT Bushing 6K |
| 1 | 153 | 1¼" × ½" NPT Bushing 6K |
| 3 | 155 | 1" M NPT × 1" M Jic 90* 6K |
| 1 | 156 | 1¼" M NPT × 1¼" M Jic Hex Nip 6K |
| 1 | 157 | 1¼" M NPT × 1¼" M Jic 90* 6K |
| 1 | 158 | 1¼" × 1" NPT Bushing 6K |
| 1 | 163 | 1½" × 1¼" NPT Bushing 6K |
| 2 | 164 | 1½" × 1" NPT Bushing 6K |
| 1 | 165 | 3" × 1¼ Bushing NPT |
| 2 | 166 | 3" All thread Sch. 80 NIP. |
| 1 | 167 | 3" Hydraulic Oil Strainer FM × FM NPT |
| 1 | 168 | 3" FM × FM NPT Gate Valve Brass |
| 4 | 170 | ¼" FM × FM Jic 6K Blue Fuel line 1' 2" |
| 3 | 171 | ¼" FM × FM Jic 6K JJ Crimp 2' 6" |
| 3 | 172 | ¼" FM × FM Jic Fuel Line 3' 6" |
| 2 | 173 | ¼" FM × FM Jic Fuel line 7' |
| 1 | 177 | ½" FM × FM Jic 6K JJ Crimp 7' |
| 5 | 181 | 1" FM × FM Jic 6K JJ crimp 4' |
| 1 | 182 | 1"FM × FM Jic 6K JJ Crimp 9'4" |
| 1 | 188 | 1¼" FM × FM Jic 6K JJ crimp 14' |
| 1 | 190 | BT 387 Hydrauic return filter (Baldwin) |
| 1 | 195 | R20P Racor filter |
| 1 | 196 | 0118-1749 Oil filter (Deutz) |
| 1 | 197 | 0118-1917 Fuel filter primary (Deutz) |
| 1 | 198 | 0131-9257 Outer Air filter (Deutz) |
| 1 | 199 | 01180-0870 Inner Air filter (Deutz) |
| 1 | 1100 | Duetz Fuel Pump |

Figure 11:
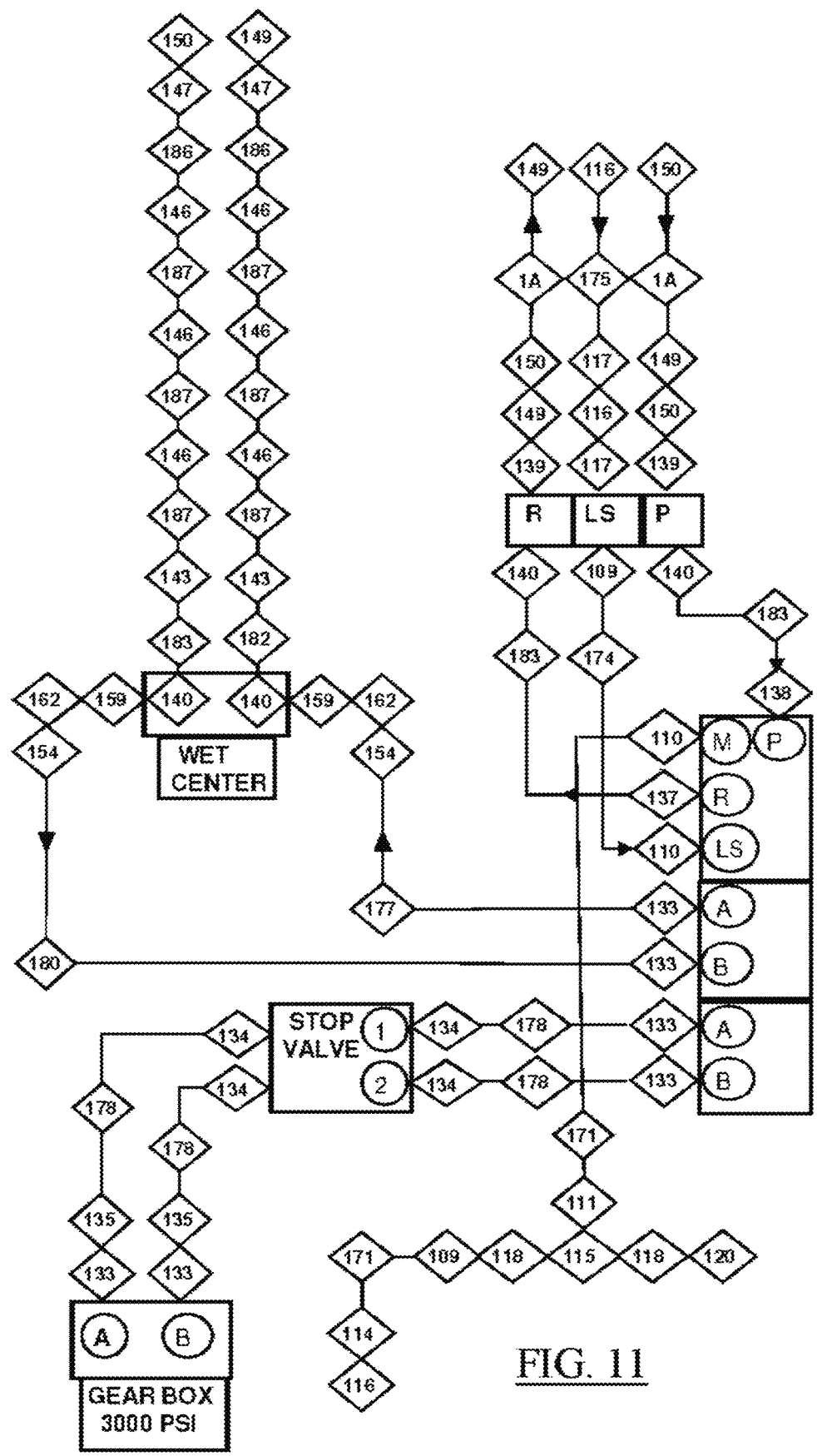
FIG. 11 is a schematic diagram of the hydraulic hose reel portion of a preferred embodiment of the apparatus of the present invention.
Figure 12:
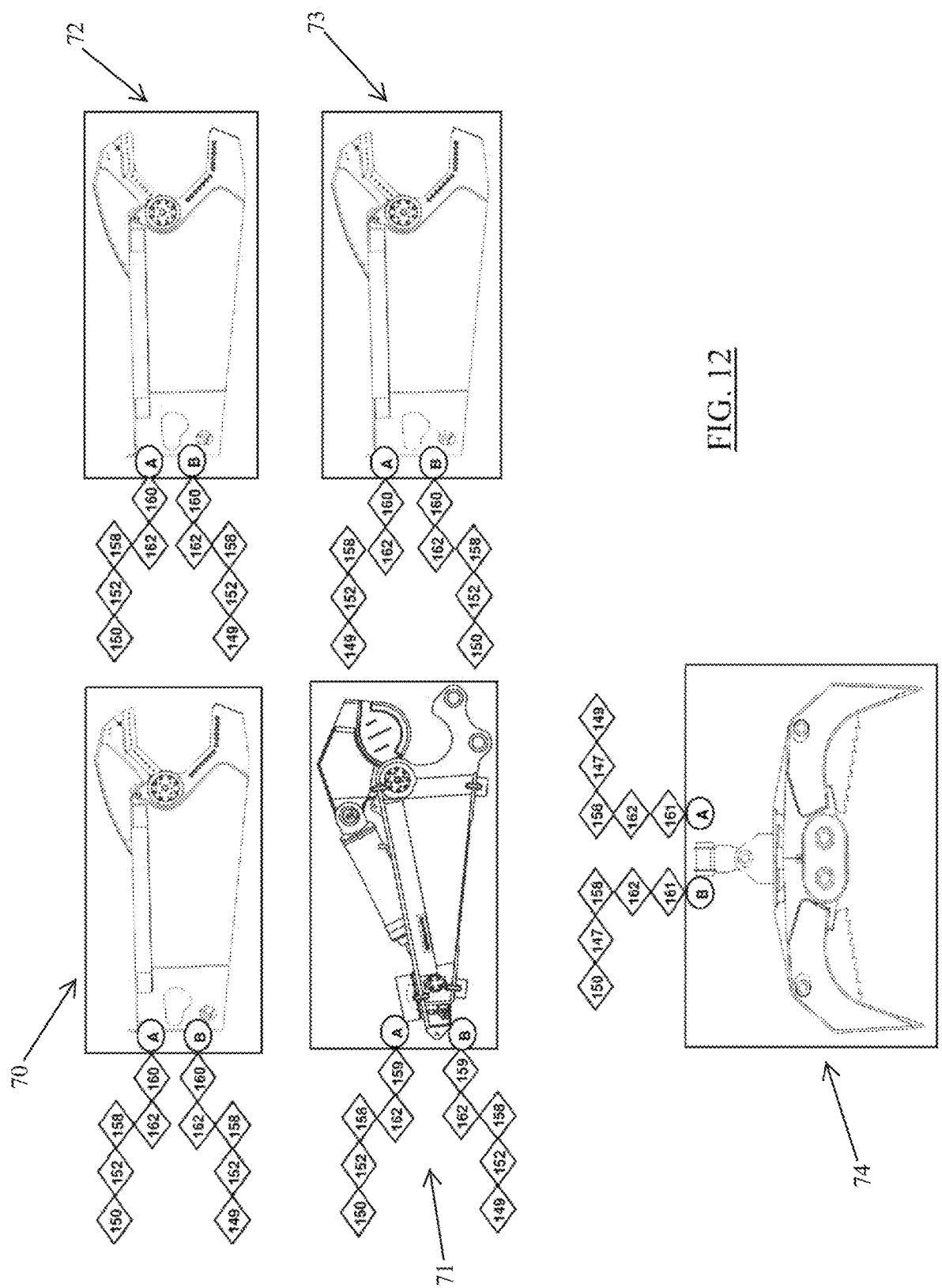
FIG. 12 shows hydraulic tool-fitting descriptions and locations of a preferred embodiment of the apparatus of the present invention.

The following is a list of parts that correspond to FIG. 11 is

| QTY | Item # | Description |
|---|---|---|
| 1 | 109 | ¼" M × M NPT Hex Nip 6K |
| 2 | 110 | ¼" M Jic × 1/4 Boss w/Jam Nut 90* 6K |
| 1 | 111 | ¼" M Jic × ¼" M NPT Hex Nip 6K |
| 1 | 114 | ¼" M NPT × .¼" M Jic Bulkhead Fit 6K |
| 1 | 115 | ¼" Tee NPT 6K |
| 3 | 116 | ¼" M Stucci × FM NPT |
| 2 | 117 | ¼" FM Stucci × FM NPT |
| 2 | 118 | ¼" M × FM NPT Needle Valve (102 FMG) |
| 1 | 120 | 10000 PSI gauge ¼" NPT (Flush Mount) |
| 6 | 133 | ¾" M Jic × ⅝" Boss #10 Hex Nip 6K |
| 4 | 134 | ¾" M Jic × ½" M NPT Hex Nip 6K |
| 2 | 135 | ¾" M Jic × ¾" FM Jic 90* 6K |

-continued

| QTY | Item # | Description |
|---|---|---|
| 1 | 137 | 1" M Jic × ¾" Boss Hex Nip 6K |
| 1 | 138 | 1" M Jic × 3/4 M Boss w/Jam Nut 90* 6K |
| 2 | 139 | 1" M × M NPT Hex Nip 6K |
| 4 | 140 | 1" M Jic × 1" M NPT 45* 6K |
| 2 | 143 | 1" M JIC × 1" M Type M Hex Nip 6K |
| 6 | 146 | 1" M × M Type-M Hex Nip 6K |
| 2 | 147 | 1" M Type-M × M NPT Hex Nip 6K |
| 4 | 149 | 1" M Stucci × FM NPT 6K |
| 4 | 150 | 1" FM Stucci × FM NPT |
| 2 | 154 | 1¼" M NPT × ¾" M Jic Hex Nip 6K |
| 2 | 159 | 1¼" × 3" SS XXH NPT Nipple |
| 2 | 162 | 1¼" Sw iv.90 w/grease cert style 60 6K |
| 2 | 171 | ¼" FM × FM Jic 6K JJ Crimp 2' 6" |
| 1 | 174 | ¼" FM × FM Jic 6K JJ crimp 11' |
| 1 | 175 | ¼" M × M NPT 6000 PSI hose 25' |
| 1 | 177 | ¾" FM × FM Jic 6K JJ crimp 7' |
| 4 | 178 | ¾" FM × FM Jic 6K JJ crimp 2' 6" |
| 1 | 180 | ¾" FM × FM Jic 6K JJ crimp 11' |
| 1 | 182 | 1" FM × FM Jic 6K JJ crimp 9' 4" |
| 3 | 183 | 1" FM × FM Jic 6K JJ crimp 11' |
| 2 | 184 | 1" M × M NPT 6000 PSI hose 25' |
| 2 | 186 | 1" FM × FM Type M ¾"Hose 25' |
| 6 | 187 | 1" FM × FM Type M ¾"Hose 150' |
| 1-A | | Flow Meter |
| 1-B | | |
| 2-A | | |
| 2-B | | |
| 3-A | | |
| 3-B | | |
| 4-A | | |
| 4-B | | |

The following is a list of parts that correspond to FIG. 12:

| QTY | Parts # | Description |
|---|---|---|
| | | SHEAR 70 |
| 1 | 149 | 1" M Stucci × FM NPT |
| 1 | 150 | 1" FM Stucci × FM NPT |
| 2 | 152 | 1" × 3" XXH NPT Nipple 6K |
| 2 | 158 | 1¼" to 1" Bushing NPT 6K |
| 2 | 160 | 1¼" × 5" XXH NPT Nipple 6K |
| 2 | 162 | Swivel Style 60 6K |
| | | SHEAR 72 |
| 1 | 149 | 1" M Stucci × FM NPT |
| 1 | 150 | 1" FM Stucci × FM NPT |
| 2 | 152 | 1" × 3" XXH NPT Nipple 6K |
| 2 | 158 | 1¼" to 1" Bushing NPT 6K |
| 2 | 160 | 1¼" × 5" XXH NPT Nipple 6K |
| 2 | 162 | Swivel Style 60 6K |
| | | SHEAR 71 |
| 1 | 149 | 1" M Stucci × FM NPT |
| 1 | 150 | 1" FM Stucci × FM NPT |
| 2 | 152 | 1" × 3" XXH NPT Nipple 6K |
| 2 | 158 | 1¼" to 1" Bushing NPT 6K |
| 2 | 159 | 1¼" × 3" XXH NPT Nipple 6K |
| 2 | 162 | Swivel Style 60 6K |
| | | SHEAR 73 |
| 1 | 149 | 1" M Stucci × FM NPT |
| 1 | 150 | 1" FM Stucci × FM NPT |
| 2 | 152 | 1" × 3" XXH NPT Nipple 6K |
| 2 | 158 | 1¼" to 1" Bushing NPT 6K |
| 2 | 160 | 1¼" × 5" XXH NPT Nipple 6K |
| 2 | 162 | Swivel Style 60 6K |
| | | GRAPPLE 74 |
| 2 | 147 | 1" M NPT × 1" M Type-M Nipple 6K |
| 1 | 149 | 1" Male Stucci 6K |
| 1 | 150 | 1" Female Stucci 6K |
| 2 | 158 | 1¼" to 1" Bushing NPT 6K |

-continued

| QTY | Parts # | Description |
|---|---|---|
| 2 | 161 | 1¼" × 7" XXH NPT Nipple 6K |
| 2 | 162 | Swivel Style 60 6K |

The following is a list of parts and materials suitable for use in the present invention:

PARTS LIST

| PART NUMBER | DESCRIPTION |
|---|---|
| 1 | marine vessel |
| 2 | water surface area |
| 3 | deck area |
| 4 | crane/lifting device |
| 5 | lifting line |
| 6 | rigging |
| 7 | seabed |
| 10 | leak detection system |
| 10A | leak detection system |
| 11 | hydraulic device/shear |
| 12 | hydraulic cylinder |
| 13 | body |
| 14 | jaw |
| 15 | pushrod |
| 16 | piston |
| 17 | chamber section |
| 18 | chamber section |
| 19 | cylinder |
| 20 | prime mover/diesel engine |
| 21 | pump |
| 22 | reservoir/hydraulic fluid |
| 23 | diesel fuel tank |
| 24 | case drain line/recycle line |
| 25 | flow line (pressure) |
| 26 | flow line (return) |
| 27 | flow line |
| 28 | hydraulic power unit |
| 30 | control station |
| 31 | flow line |
| 32 | flow line |
| 33 | computer/controller |
| 38 | drive motor for hose reel |
| 40 | hose reel |
| 41 | flow line |
| 42 | flow line |
| 45 | flow meter |
| 46 | flow meter |
| 47 | object/pipe |
| 48 | arrow |
| 49 | arrow |
| 50 | prime mover/electric motor |
| 51 | battery |
| 52 | positive lead |
| 53 | negative lead |
| 54 | hydraulic control valve |
| 55 | rotary cam switch |
| 56 | start button |
| 57 | lamp |
| 58 | lamp |
| 59 | jaw |
| 60 | attachment |
| 61 | pivotal connection |
| 62 | pivotal connection |
| 63 | arrow |
| 64 | solenoid operated valve |
| 65 | flow line |
| 66 | switch/solenoid operated switch |
| 67 | cooler |
| 68 | lever |
| 70 | shear |
| 71 | shear |
| 72 | shear |
| 73 | shear |
| 74 | grapple |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of deactivating an underwater hydraulic device, comprising the steps of:
   a) providing a hydraulic device that is capable of being operated at a seabed area and under water, the hydraulic device having a jaw that moves between closed cutting and opened positions and a hydraulic cylinder with a pushrod and a piston that opens and closes said jaw;
   b) lowering the hydraulic device and end portions of first and second hydraulic hoses from a water surface area to the seabed area wherein the hoses are wound upon a hose reel that is located on a floating vessel at the water surface area;
   c) wherein the hose reel of step "b" includes the first and second hydraulic hoses that each terminate at said hydraulic device by connecting to the cylinder on first and second opposing sides of the piston and wherein said first and second hydraulic hoses each have a length that enables lowering of the hydraulic device and the hose end portions from the water surface to the seabed area;
   d) wherein said first and second hydraulic hoses in step "b" include a supply hose to the hydraulic device of step "a" and a return hose that returns the hydraulic fluid from the device of step "a" to the hose reel of step "b";
   e) providing a hydraulic pump and hydraulic fluid reservoir on the floating vessel at the water surface area for providing the hydraulic fluid under pressure to said first and second hydraulic hoses via third and fourth hydraulic hoses;
   f) wherein in step "c", the first hose transmits the hydraulic fluid from the hose reel to the hydraulic device, the second hose transmits the hydraulic fluid from the hydraulic device to the hose reel, the third hydraulic hose transmits hydraulic fluid from the pump to the hose reel and the fourth hydraulic hose transmits hydraulic fluid from the hose reel to the hydraulic fluid reservoir;
   g) using the hydraulic device of step "a" to cut an underwater object;
   h) intermittently monitoring a first and second volume of the hydraulic fluid flowing respectively in the third and fourth hydraulic hoses with a first flow meter interfaced with the third hydraulic hose, wherein the first flow meter measures fluid flow in the third hydraulic hose and a second flow meter interfaced with the fourth hydraulic hose, wherein second flow meter measures fluid flow in the fourth hydraulic hose, said third and fourth hoses including a pressure line that transmits hydraulic fluid from the pump to the hose reel and a return flow line that returns hydraulic fluid from the hose reel to the hydraulic fluid reservoir;
   i) providing a control valve that is interfaced with the third and fourth hydraulic hoses at a position in between said flow meters and said hydraulic pump and reservoir, said control valve having a control that enables reversal of fluid flow in said third and fourth hydraulic hoses so that the third hydraulic hose functions as the return line and the fourth hydraulic hose functions as the pressure line;
   j) using dimensions of the hydraulic cylinder to calculate a ratio of the first volume of the hydraulic fluid flowing in the first hydraulic hose into a first chamber of the hydraulic cylinder on the first side of the piston to the second volume of fluid flowing in the second hydraulic hose into a second chamber of the hydraulic cylinder from a second side of the piston;
   k) deactivating the hydraulic device if the ratio of step "j" varies from a preset ratio or preset value;
   l) wherein in step "j", either the first or the second chamber contains a varying amount of the pushrod as the pushrod moves between extended and retracted positions; and
   m) using the control valve of step "i" to change flow direction in said third and fourth hydraulic hoses.

2. The method of claim 1, wherein the monitoring of step "h" further includes acquiring a plurality of flow rate samples from the hydraulic hoses within a predetermined time ranging from 1 to 60 seconds; wherein step "j" further includes calculating the ratio for each of the flow rate samples; and wherein step "k" further includes deactivating the hydraulic device within the predetermined time if the ratio for each of the flow rate samples varies from a preset allowable variation of the preset ratio.

3. The method of claim 1 wherein a controller continuously monitors the fluid flow measured by the first and second flow meters and continuously calculates the ratio of step "j".

4. The method of claim 3 further comprising providing a selector switch having multiple selectable switch positions and wherein the ratio of step "j" can be varied by selecting a different position of the selector switch.

5. The method of claim 1 wherein the hydraulic device receives the hydraulic fluid under pressure from a prime mover and said hydraulic pump, and in step "k", the prime mover and pump assembly are deactivated.

6. The method of claim 1 wherein the first and second volumes of fluid of step "j" are automatically calculated after step "h".

7. The method of claim 1 wherein the hose reel enables the hydraulic device to be lowered to the seabed area.

8. The method of claim 1, wherein the preset ratio is set by observing a normal ratio when the hydraulic device is operating normally.

9. The method of claim 1 further comprising the step of setting an allowable variation of the preset ratio and, wherein step "k" further includes deactivating the hydraulic device if the ratio of step "j" varies beyond the allowable variation of the preset ratio.

10. The method of claim 1 wherein a controller monitors fluid flow of step "h" and deactivates the hydraulic device in step "k", and further comprising the step of operatively connecting a computer to the controller for programming operating values into the controller.

11. The method of claim 1 wherein the hose reel has a fluid inlet that receives hydraulic fluid from the pump and a fluid outlet, the fluid outlet being fluidly connected to return hydraulic fluid to the hydraulic fluid reservoir.

12. The method of claim 1 wherein the first and second hydraulic hoses are wound on the hose reel at an angle that is greater than 360 degrees.

13. A method of deactivating a hydraulic device, comprising the steps of:

a) providing a floating vessel with a control station, a prime mover, a hydraulic pump powered by said prime mover and a pump fluid reservoir that supplies hydraulic fluid to the pump;

b) providing a hydraulic device that is capable of being operated under water, the hydraulic device having a cutting jaw that is movable between a closed cutting position and an open position and a hydraulic cylinder with a pushrod and a piston that moves the jaw between said open and closed positions;

c) lowering the hydraulic device to a seabed area with a hose reel that is located on said floating vessel;

d) wherein the hose reel of step "c" includes first and second hydraulic hoses that are each wound upon the hose reel and that each terminate at said hydraulic device by connecting a lower end portion of each said first and second hydraulic hoses to the hydraulic cylinder on respective first and second sides of the piston;

e) using the hydraulic device to cut an underwater object;

f) monitoring hydraulic fluid flow in third and fourth hydraulic hoses with a first flow meter and a second flow meter, wherein the first flow meter is in a third flow line that is located in between the hose reel and hydraulic pump and the second flow meter is in a fourth flow line that is located in between the hose reel and pump fluid reservoir;

g) connecting each of said third and fourth flow lines to a control valve that is in between said flow meters and said pump and reservoir, said control valve having a control that enables flow reversal in said third and fourth flow lines so that the third flow line is a pressure flow line in a first control valve position and a return flow line in a second control valve position and the fourth flow line is a return flow line in a first control valve position and a pressure flow line in a second control valve position;

h) calculating a ratio of a first volume of fluid in the first hydraulic hose that enters a pushrod retraction chamber section of the hydraulic cylinder to a second volume of fluid in the second hydraulic hose that enters a pushrod extension chamber of the hydraulic cylinder;

i) deactivating the hydraulic device if the ratio of step "h" varies from a preset value; and j) wherein in step "h", one of the chambers contains a varying amount of the pushrod as the pushrod moves between extended and retracted positions.

14. The method of claim 13 wherein a controller continuously monitors fluid flow with the first and second flow meters and continuously calculates the ratio of step "h".

15. The method of claim 13 wherein the hydraulic device receives the hydraulic fluid under pressure from the prime mover and the hydraulic pump assembly and in step "i", the prime mover and pump assembly are deactivated.

16. The method of claim 13, wherein the monitoring of step "f" further includes acquiring a plurality of flow rate samples from the hydraulic hoses within a predetermined time ranging from 1 to 60 seconds; wherein step "h" further includes calculating the ratio for each of the flow rate samples; and wherein step "i" further includes deactivating the hydraulic device within the predetermined time if the ratio for each of the flow rate samples varies from a preset allowable variation of the preset ratio.

17. The method of claim 13 further comprising providing a selector switch having multiple selectable switch positions and wherein the ratio of step "h" can be varied by selecting a different position of the selector switch.

18. The method of claim 13 wherein the first and second hydraulic hoses are wound on the hose reel at an angle that is greater than 360 degrees.

19. A hydraulic power unit leak detection apparatus, comprising:

a) a floating vessel having a control station that includes a storage reel, a prime mover, a pump and a pump fluid reservoir;

b) a hydraulic device that is operated with said prime mover, said pump, and a hydraulic cylinder having a cylinder, pushrod, and piston;

c) the hydraulic cylinder having a first chamber that is receptive of hydraulic fluid when extending the pushrod and a second chamber that is receptive of the hydraulic fluid when retracting the pushrod, wherein the second chamber contains varying amounts of the pushrod as the pushrod moves between extended and retracted positions;

d) the storage reel holding a first hydraulic fluid flow line that supplies the hydraulic fluid to the first chamber;

e) a third flow line in between the pump and hose reel;

f) a fourth flow line that is in between the hose reel and the pump fluid reservoir;

g) a first flow meter in said third flow line, wherein said first flow meter measures fluid flow upstream of said storage reel;

h) the storage reel holding a second hydraulic flow line that supplies the hydraulic fluid to the second chamber;

i) a second flow meter in said fourth flow line that measures fluid flow upstream of said storage reel;

j) wherein the said first and second hydraulic flow lines are wound upon said storage reel and said first and second hydraulic flow lines each having a length that enables the hydraulic device when connected to said first and second hydraulic flow lines to be lowered from said floating vessel to a seabed area, wherein each of said first and second hydraulic flow lines has a lower end that terminates at a connection to the hydraulic device;

k) a computer interfaced with said first and second flow meters that continuously monitors a ratio of a first volume of the hydraulic fluid entering the first chamber to a second volume of the hydraulic fluid entering the second chamber;

l) the computer operatively connected to the prime mover so that the computer can deactivate the prime mover when the ratio varies a preset allowable variation from a preset acceptable value;

m) the computer monitoring hydraulic fluid flow in the third and fourth hydraulic hoses with said first and second flow meters;

n) a control valve that is in between said flow meters and said pump and reservoir and in fluid communication with said third and fourth flow lines, said control valve having a control that enables flow reversal in said third and fourth flow lines so that the third flow line is a pressure flow line in a first control valve position and a return flow line in a second control valve position and the fourth flow line is a return flow line in a first control valve position and a pressure flow line in a second control valve position;

o) wherein the computer uses known dimensions of the first and second chambers to continuously calculate the ratio of the first volume of the hydraulic fluid entering the first chamber relative to the second volume of hydraulic fluid entering the second chamber;

p) wherein the computer in step "k" continuously monitors the ratio by acquiring a plurality of flow rate samples from the first and second flow meters within a predetermined time ranging from 1 to 60 seconds and calculates the ratio for each of the plurality of flow rate samples; and q) wherein the computer in step "k" deactivates the prime mover within the predetermined time if the ratio of one of the plurality of flow rate samples of step "p" varies from the preset allowable variation from the preset acceptable value.

20. The apparatus of claim 19 wherein the first and second flow meters continuously transmit flow data to the computer.

21. The apparatus of claim 19 further comprising a selector switch that enables the computer to compare the said ratio with a selected one of a plurality of ratios, each ratio of the plurality of ratios corresponding to different hydraulic cylinder configurations.

22. The apparatus of claim 19 wherein the computer is programmable to designate any ratio as the preset value.

23. The apparatus of claim 19 wherein the preset value is a range.

* * * * *